United States Patent
Cook et al.

(10) Patent No.: US 10,616,377 B2
(45) Date of Patent: Apr. 7, 2020

(54) SYSTEM AND METHOD FOR IMPLEMENTING NETWORK ENHANCED GATEWAY FUNCTIONALITY

(71) Applicant: CenturyLink Intellectual Property LLC, Denver, CO (US)

(72) Inventors: Charles I. Cook, Louisville, CO (US); Michael K. Bugenhagen, Leawood, KS (US); Kevin M. McBride, Lone Tree, CO (US); Andrew V. Cook, Sheldon, IA (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 236 days.

(21) Appl. No.: 15/148,688

(22) Filed: May 6, 2016

(65) Prior Publication Data

US 2016/0330140 A1 Nov. 10, 2016

Related U.S. Application Data

(60) Provisional application No. 62/157,795, filed on May 6, 2015, provisional application No. 62/159,788, filed
(Continued)

(51) Int. Cl.
*H04B 10/27* (2013.01)
*H04L 12/28* (2006.01)
(Continued)

(52) U.S. Cl.
CPC .............. *H04L 69/16* (2013.01); *H04B 10/27* (2013.01); *H04L 12/28* (2013.01);
(Continued)

(58) Field of Classification Search
None
See application file for complete search history.

(56) References Cited

U.S. PATENT DOCUMENTS 6,577,327 B1 6/2003 Rochford et al.
8,051,382 B1 11/2011 Kingdom et al.
(Continued)

FOREIGN PATENT DOCUMENTS

WO  WO-2017-146768  8/2017

OTHER PUBLICATIONS

"Balaza Nemeth, Xavier Simonart, Neal Oliver, The Limits of Architectural Abstraction in Network Function Virtualization, May 1, 2015, IPIP/IEEE International Symposium on Integrated Network Management (IM2015): Mini-Conference, pp. 633-639" (Year: 2015).*

(Continued)

*Primary Examiner* — Clayton R Williams
*Assistant Examiner* — Christopher B Robinson

(57) ABSTRACT

Novel tools and techniques are provided for implementing network enhanced gateway functionality, and, in particular embodiments, for implementing network enhanced gateway functionality using network functions virtualization ("NFV") and/or software defined networks ("SDNs"). In some embodiments, a network switch, which is disposed within a gateway device, might route network traffic to a host computing system, at least a portion of the network traffic being originally directed to a client device via a corresponding client port among a plurality of client ports. Based at least in part on one or more characteristics of the at least a portion of the network traffic, the host computing system selects one or more virtual network functions ("VNFs"), which are then sent to the host computing system via the network switch. According to some embodiments, the network switch and the host computing system are under control of a NFV entity and/or a SDN controller.

35 Claims, 8 Drawing Sheets

Related U.S. Application Data on May 11, 2015, provisional application No. 62/172,359, filed on Jun. 8, 2015.

(51) Int. Cl.

| | | |
|---|---|---|
| *H04L 12/66* | (2006.01) | |
| *H04L 29/06* | (2006.01) | |
| *H04L 29/08* | (2006.01) | |
| *H04L 12/715* | (2013.01) | |
| *H04L 12/947* | (2013.01) | |
| *H04L 12/46* | (2006.01) | |
| *H04W 84/12* | (2009.01) | |
| *H04W 88/12* | (2009.01) | |

(52) U.S. Cl.
CPC ...... *H04L 12/2878* (2013.01); *H04L 12/4641* (2013.01); *H04L 12/66* (2013.01); *H04L 45/64* (2013.01); *H04L 49/25* (2013.01); *H04L 67/02* (2013.01); *H04L 67/10* (2013.01); *H04L 67/12* (2013.01); *H04L 2012/4629* (2013.01); *H04W 84/12* (2013.01); *H04W 88/12* (2013.01)

(56) References Cited

U.S. PATENT DOCUMENTS

| | | | |
|---|---|---|---|
| 9,733,975 | B2 | 8/2017 | Cook et al. |
| 2006/0184998 | A1 | 8/2006 | Smith |
| 2006/0224669 | A1 | 10/2006 | Wouhaybi |
| 2006/0236095 | A1 | 10/2006 | Smith |
| 2007/0014306 | A1 | 1/2007 | Tirri |
| 2007/0115962 | A1 | 5/2007 | Mammoliti |
| 2007/0124406 | A1* | 5/2007 | Liu ...................... H04L 67/025 709/209 |
| 2008/0025321 | A1 | 1/2008 | Gudipudi |
| 2008/0043640 | A1 | 2/2008 | Smith |
| 2008/0155423 | A1 | 6/2008 | Moran |
| 2008/0205273 | A1* | 8/2008 | Wackerly ............. H04L 43/026 370/235 |
| 2009/0290595 | A1* | 11/2009 | Celebioglu ........... G06F 13/385 370/419 |
| 2010/0080238 | A1 | 4/2010 | Allan |
| 2010/0149999 | A1* | 6/2010 | Beattie, Jr. ............ H04L 43/00 370/249 |
| 2010/0169780 | A1* | 7/2010 | Bryant-Rich ........ G11B 27/005 715/719 |
| 2010/0177642 | A1* | 7/2010 | Sebastian ................ H04L 69/22 370/248 |
| 2011/0317678 | A1 | 12/2011 | Allan et al. |
| 2012/0072564 | A1* | 3/2012 | Johnsen ............... H04L 12/462 709/223 |
| 2012/0233350 | A1* | 9/2012 | Unbehagen ......... H04L 12/4625 709/241 |
| 2013/0061297 | A1 | 3/2013 | Larsen et al. |
| 2013/0204971 | A1 | 8/2013 | Brandywine et al. |
| 2014/0112349 | A1 | 4/2014 | Moreno |
| 2014/0201374 | A1* | 7/2014 | Ashwood-Smith ..... H04L 49/70 709/226 |
| 2014/0317293 | A1* | 10/2014 | Shatzkamer ........ G06F 9/45558 709/226 |
| 2014/0321298 | A1 | 10/2014 | Chow |
| 2015/0052600 | A1* | 2/2015 | Weinsberg .......... H04L 12/4641 726/13 |
| 2015/0212856 | A1 | 7/2015 | Shanmuganathan et al. |
| 2015/0256357 | A1 | 9/2015 | Rajendran |
| 2015/0263946 | A1* | 9/2015 | Tubaltsev ............. H04L 45/586 370/392 |
| 2015/0295750 | A1* | 10/2015 | Blanco ...................... G06F 9/50 714/4.2 |
| 2016/0006696 | A1 | 1/2016 | Donley et al. |
| 2016/0044035 | A1 | 2/2016 | Huang |
| 2016/0094667 | A1* | 3/2016 | Jani ........................ H04L 67/16 709/202 |
| 2016/0329965 | A1 | 11/2016 | Cook et al. |
| 2016/0330074 | A1 | 11/2016 | Cook et al. |
| 2016/0330613 | A1 | 11/2016 | Cook et al. |
| 2016/0335111 | A1* | 11/2016 | Bruun ................. G06F 9/45558 |
| 2016/0337206 | A1 | 11/2016 | Bugenhagen et al. |
| 2017/0034763 | A1 | 2/2017 | Reddy et al. |
| 2017/0111221 | A1 | 4/2017 | Chouhan |
| 2017/0308395 | A1 | 10/2017 | Cook et al. |
| 2019/0028573 | A1 | 1/2019 | Cook et al. |

OTHER PUBLICATIONS

International Search Report and Written Opinion prepared by the Korean Intellectual Property Office as International Searching Authority for PCT Intl Patent App. No. PCT/US2016/044867; 13 pages.
U.S. Appl. No. 15/148,721; Ex Parte Quayle Action dated Mar. 13, 2017; 39 pages.
U.S. Appl. No. 15/148,721; Notice of Allowance; 14 pages.
International Preliminary Report on Patentability, PCT-US2016-044867, dated Sep. 7, 2018, 10 pages.

* cited by examiner

SYSTEM AND METHOD FOR IMPLEMENTING NETWORK ENHANCED GATEWAY FUNCTIONALITY

CROSS-REFERENCES TO RELATED APPLICATIONS

This application claims priority to U.S. Patent Application Ser. No. 62/157,795 (the "'795 application"), filed May 6, 2015 by Charles I. Cook et al. and titled, "NFVI Enhanced Open Business/Residential Gateways and Customer Portal", U.S. Patent Application Ser. No. 62/159,788 (the "'788 application"), filed May 11, 2015 by Charles I. Cook et al. and titled, "NFVI Enhanced Open Business/Residential Gateways and Customer Portal", U.S. Patent Application Ser. No. 62/172,359 (the "'359 application"), filed Jun. 8, 2015 by Charles I. Cook et al. and titled, "Enhanced LAN With Customer Portal Control".

This application may be related to U.S. patent application Ser. No. 14/678,208 (the "'208 application"), filed Apr. 3, 2015 by Michael J. Fargano et al. and titled, "Network Functions Virtualization Interconnection Gateway", which claims priority to U.S. Patent Application Ser. No. 61/974,927, filed Apr. 3, 2014 by Michael J. Fargano and titled, "Network Functions Virtualization Interconnection Gateway"; U.S. patent application Ser. No. 14/678,280 (the "'280 application"), filed on Apr. 3, 2015 by Michael J. Fargano et al. and titled, "Network Functions Virtualization Interconnection Hub", which claims priority to U.S. Patent Application Ser. No. 61/974,930, filed Apr. 3, 2014 by Michael J. Fargano and titled, "Network Functions Virtualization Interconnection Hub"; U.S. patent application Ser. No. 14/678,309 (the "'309 application"), filed Apr. 3, 2015 by Michael J. Fargano et. al and titled, "Customer Environment Network Functions Virtualization (NFV)", which claims priority to U.S. Patent Application Ser. No. 61/976,896, filed Apr. 8, 2014 by Michael J. Fargano and titled, "Customer Environment Network Functions Virtualization (NFV)" and U.S. Patent Application Ser. No. 61/977,820, filed Apr. 10, 2014 by Michael J. Fargano and titled, "Customer Environment Network Functions Virtualization (NFV)"; U.S. patent application Ser. No. 14/730,695 (the "'695 application"), filed Jun. 4, 2015 by Charles I. Cook et al. and titled, "Remoting Application Servers", which claims priority to U.S. Patent Application Ser. No. 62/037,096, filed Aug. 13, 2014 by Charles I. Cook et al. and titled, "Remoting Application Servers"; and U.S. patent application Ser. No. 14/983,884 (the "'884 application"), filed Dec. 30, 2015 by Kevin M. McBride et al. and titled, "Intent-Based Services Orchestration", which claims priority to U.S. Patent Application Ser. No. 62/233,911, filed Sep. 28, 2015 by Kevin M. McBride et al. and titled, "Intent-Based Services Orchestration" and U.S. Patent Application Ser. No. 62/247,294, filed Oct. 28, 2015 by Kevin M. McBride et al. and titled, "Intent-Based Services Orchestration"; and U.S. patent application Ser. No. 14/983,758 (the "'758 application"), filed Dec. 30, 2015 by Michael K. Bugenhagen and titled, "Virtual Machine-To-Port Peripheral Device Driver", which claims priority to U.S. Patent Application Ser. No. 62/237,981, filed Oct. 6, 2015 by Michael K. Bugenhagen and titled, "NFV Peripheral Network Driver for VNF's".

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for implementing network enhanced gateway functionality, and, in particular embodiments, to methods, systems, apparatus, and computer software for implementing network enhanced gateway functionality using network functions virtualization ("NFV") and/or software defined networks ("SDNs").

BACKGROUND

Historically, wide area network/local area network ("WAN/LAN") network functions or functionality have been performed by dedicated hardware in a network interface device ("NID") or gateway device that is located at the customer location or customer premises. The NID or gateway device comprises a user network interface ("UNI"), which is in essence the demarcation point for the service. Maintaining dedicated NID or gateway deployments requires both firmware and software upgrades, but yields no "bump in the wire" or platform capabilities, and has diminishing value as new services and features emerge that the NID or gateway device cannot support.

Hence, there is a need for more robust and scalable solutions for implementing network enhanced gateway functionality, and, in particular embodiments, to methods, systems, apparatus, and computer software for implementing network enhanced gateway functionality using network functions virtualization ("NFV") and/or software defined networks ("SDNs").

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1A:
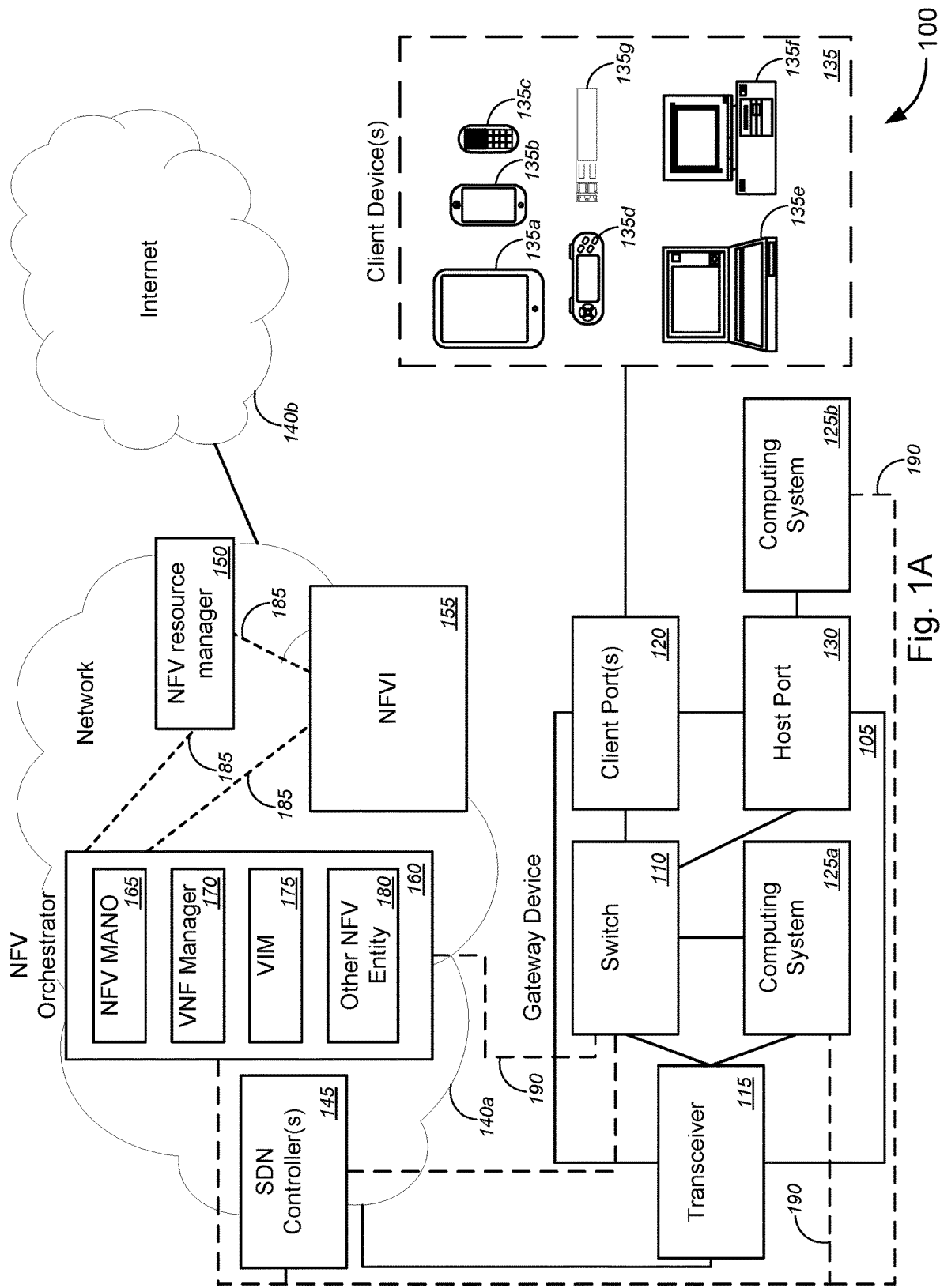
FIG. 1A is a schematic diagram illustrating a system for implementing network enhanced gateway functionality, in accordance with various embodiments.

Various embodiments provide tools and techniques for implementing network enhanced gateway functionality, and, in particular embodiments, to methods, systems, apparatus, and computer software for implementing network enhanced gateway functionality using network functions virtualization ("NFV") and/or software defined networks ("SDNs").

In various embodiments, a network switch, which is disposed within a gateway device, might route network traffic to a host computing system, at least a portion of the network traffic being originally directed to a client device via the network switch and via a corresponding client port among a plurality of client ports. Based at least in part on one or more characteristics of the at least a portion of the network traffic that is directed to the client device, the host computing system selects one or more virtual network functions ("VNFs"). The selected one or more VNFs are then sent to the host computing system via the network switch. In some embodiments, the client devices might be VNF-capable (including, but not limited to, a set-top box or a local Internet of Things ("IoT") controller, and/or the like), and the host computing system might send one or more second VNFs (which might be the same as the selected one or more VNFs or might be based on the selected one or more VNFs) to the client devices via the network switch and corresponding client port. According to some embodiments, the network switch and the host computing system are under control of a NFV entity and/or a SDN controller, which provide network enhanced gateway functionalities to the gateway device, as described herein. In some cases, the NFV entity might include, but is not limited to, at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator, and/or the like.

The network traffic between the network switch and the host computing system, in some embodiments, is at least one of uni-directional network traffic, bi-directional network traffic, or split directional network traffic that originates from at least one of one or more of the plurality of client ports or one or more network ports. In some cases, the one or more characteristics of the received network traffic comprises at least one of one or more attributes of an Ethernet frame, one or more media access control ("MAC") source addresses, one or more MAC destination addresses, one or more Internet Protocol ("IP") source addresses, one or more IP destination addresses, one or more transmission control protocol ("TCP") source ports, one or more TCP destination ports, one or more priority bits, one or more particular bit patterns, bandwidth of a flow, one or more switch ports, one or more ingress ports, one or more Ethernet type identifiers, one or more virtual local area network ("VLAN") identifiers, one or more network protocol identifiers, or one or more action instructions, and/or the like.

According to some embodiments, the host computing system and the network switch are disposed within a single gateway device. Alternatively, or additionally, the host computing system (or a second host computing system) might be located external to a gateway device in which the network switch is disposed, the gateway device might comprise a host port(s), and the host computing system might communicatively couple to the network switch via the host port(s). The gateway device, in some embodiments, might include, without limitation, at least one of a customer premises equipment ("CPE"), a router, a switch, a network element, a demarcation device, a WiFi gateway device, a hypervisor platform, and one or more virtual machine-based host machines, and/or the like. The CPE, which might be located at or near a customer premises associated with a user of the client device, might comprise at least one of an optical network terminal ("ONT"), a network interface device ("NID"), an enhanced NID ("eNID"), a residential gateway ("RG") device, a business gateway ("BG") device, or a virtual gateway ("vG") device, and/or the like.

Merely by way of example, the client device might comprise a user device, including, but not limited to, one of a tablet computer, a smart phone, a mobile phone, a portable gaming device, a laptop computer, or a desktop computer, and/or the like. Alternatively, the client device might include a device selected from a group consisting of a small form factor pluggable ("SFP") device, an enhanced SFP ("SFP+") device, a compact SFP ("CSFP") device, a gigabit interface converter ("GBIC"), a universal serial bus ("USB") pluggable device, and/or the like. In some cases, at least one of the SFP device, the SFP+ device, or the CSFP device might comprise at least one of a SFP network interface device ("NID"), a SFP router, a SFP modem, or a SFP wireless access point, and/or the like. In some instances, the USB pluggable device might comprise one of a printer, a scanner, a combination printer/scanner device, an external hard drive, a camera, a keyboard, a mouse, a drawing interface device, or a mobile device, and/or the like.

In some embodiments, the one or more VNFs provide the client device with one or more functions, the one or more functions comprising at least one of an activation function, an operation function, a deletion function, a specialized function, a firewall function, an Internet of Things ("IoT") proxy function, an application-related function, or an operations, administration, and management ("OAM") function, and/or the like. In some cases, the specialized function might itself be a VNF. According to some embodiments, each of the plurality of client ports might include, without limitation, one of a local area network ("LAN") port, a Wi-Fi port, an advanced technology attachment ("ATA") port, a serial ATA ("SATA") port, an external SATA ("eSATA") port, a powered eSATA ("eSATAp") port, a mini SATA ("mSATA") port, a SATA Express port, a M.2 port, or a universal serial bus ("USB") port, and/or the like.

In various aspects, the host computing system might comprise one or more computing cores, preferably two or more computing cores. In some cases, at least one first computing core might perform functions of a gateway device, while at least one second computing core might perform hypervisor functions to support VNFs. According to some embodiments, the host computing system might comprise at least one of an x86 host computing device or an advanced reduced instruction set computer ("RISC") machine ("ARM") computing device. In some embodiments, the network switch might be a virtual network switch that utilizes a network switch VNF to provide network switching functionality. In some instances, the transceiver might be a virtual transceiver that utilizes a transceiver VNF to provide transceiver functionality.

The various embodiments address the abovementioned issues that exist in conventional NIDs or similar gateway devices, by altering the composure of the NID or other gateway device to take on a "platform" approach that places virtualization in the network for the customer or provider to leverage at the central office, at the NID or gateway device, or attached to the NID or gateway device itself, thereby effectively becoming a network enhanced NID or gateway device. The network enhanced NID or gateway device, by virtue of its "platform" capability, enables a more future-proof infrastructure that can provide support for new applications and/or functions.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network virtualization technology, network configuration technology, network resource allocation technology, residential/business/virtual gateway function technology, and/or the like. In other aspects, certain embodiments, can improve the functioning of user equipment or systems themselves (e.g., telecommunications equipment, network equipment, client devices, host computing devices, network switches, etc.), for example, by selecting particular virtual network functions ("VNFs") based at least on one or more characteristics of network traffic flowing through the residential/business/virtual gateway, and sending (or providing access to) the selected VNFs to the network equipment (including, without limitation, one or more of the network switch, the host computing system(s), the transceiver, the network port(s), the client port(s), the client device(s), and/or the like), and/or the like. In particular, to the extent any abstract concepts are present in the various embodiments, those concepts can be implemented as described herein by devices, software, systems, and methods that involve specific novel functionality (e.g., steps or operations), such as improving the functionality of the network components or equipment (e.g., the gateway device or the like), improving the functionality of client devices that are communicatively coupled to the gateway device, improving the network itself, and/or the like, to name a few examples, that extend beyond mere conventional computer processing operations. These functionalities can produce tangible results outside of the implementing computer system, including, merely by way of example, ability to select particular VNFs based at least on one or more characteristics of network traffic flowing through the gateway device, ability to send or provide access to the selected VNFs, improvement to the functionality of the gateway device, improvement to the functionality of client devices that are communicatively coupled to the gateway device, improvement to the network itself, and/or the like, which may be observed or measured by customers and/or service providers.

In an aspect, a method might comprise receiving, with a network switch disposed within a gateway device, network traffic, at least a portion of the network traffic being directed to a client device via the network switch and via corresponding client port among a plurality of client ports, and routing, with the network switch, the network traffic to a host computing system. The method might further comprise selecting, with the host computing system, one or more virtual network functions ("VNFs"), based at least in part on one or more characteristics of the received network traffic, and sending, via the network switch, at least one VNF of the selected one or more VNFs to the host computing system, the at least one VNF being selected by the host computing system based at least in part on one or more characteristics of the at least a portion of the network traffic that is directed to the client device.

In some embodiments, the network switch and the host computing system might be under control of at least one of a network functions virtualization ("NFV") entity or a software defined network ("SDN") controller. In some cases, the NFV entity might comprise at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator, and/or the like.

According to some embodiments, the host computing system and the network switch might be disposed within a single gateway device. Alternatively, or additionally, the host computing system (or a second host computing system) might be located external to the gateway device in which the network switch is disposed, the gateway device might comprise a host port, and the host computing system might communicatively couple to the network switch via the host port. In some instances, the host computing system might host an instantiated network functions virtualization infrastructure ("NFVI") system.

Merely by way of example, in some embodiments, the network switch might comprise at least one network-to-network interface ("NNI") and at least one user network interface ("UNI"), the NNI receiving the network traffic and communicatively coupling with the host computing system, and the UNI communicatively coupling with the client device via the corresponding client port of the plurality of client ports. According to some embodiments, the network switch might be a virtual network switch that utilizes a network switch VNF to provide network switching functionality.

In some instances, the gateway device might be selected from a group consisting of a customer premises equipment ("CPE"), a router, a switch, a network element, a demarcation device, a WiFi gateway device, a hypervisor platform, and one or more virtual machine-based host machines. The CPE, in some cases, might comprise at least one of an optical network terminal ("ONT"), a network interface device ("NID"), an enhanced NID ("eNID"), a residential gateway ("RG") device, a business gateway ("BG") device, or a virtual gateway ("vG") device, and/or the like, and the gateway device might be located at or near a customer premises associated with a user of the client device.

The client device, according to some embodiments, might include, without limitation, a user device comprising one of a tablet computer, a smart phone, a mobile phone, a portable gaming device, a laptop computer, or a desktop computer, and/or the like. Alternatively, the client device might include a device selected from a group consisting of a small form factor pluggable ("SFP") device, an enhanced SFP ("SFP+") device, a compact SFP ("CSFP") device, a gigabit interface converter ("GBIC"), and a universal serial bus ("USB") pluggable device, and/or the like. In some cases, at least one of the SFP device, the SFP+ device, or the CSFP device might comprise at least one of a SFP network interface device ("NID"), a SFP router, a SFP modem, or a SFP wireless access point, and/or the like. The USB pluggable device, in some instances, might comprise one of a printer, a scanner, a combination printer/scanner device, an external hard drive, a camera, a keyboard, a mouse, a drawing interface device, or a mobile device, and/or the like.

According to some embodiments, the client device includes a VNF-capable user device comprising one of a set-top box or an Internet of Things ("IoT") controller, wherein the method further comprises sending, with the host computing system and via the network switch and the corresponding client port, at least one second VNF of the selected one or more VNFs to the client device, the at least one second VNF being selected by the host computing system based at least in part on one or more characteristics of the at least a portion of the network traffic that is directed to the client device. In some cases, sending, with the host computing system and via the network switch and the corresponding client port, the selected one or more VNFs to the client device might comprise bursting, using an application programming interface ("API"), the one or more VNFs from the NFV entity to the client device. In some embodiments, the one or more VNFs might provide the client device with one or more functions, the one or more functions comprising at least one of an activation function, an operation function, a deletion function, a specialized function, a firewall function, an Internet of Things ("IoT") proxy function, an application-related function, or an operations, administration, and management ("OAM") function, and/or the like.

Merely by way of example, in some instances, each of the plurality of client ports might comprise one of a local area network ("LAN") port, a Wi-Fi port, an advanced technology attachment ("ATA") port, a serial ATA ("SATA") port, an external SATA ("eSATA") port, a powered eSATA ("eSATAp") port, a mini SATA ("mSATA") port, a SATA Express port, a M.2 port, or a universal serial bus ("USB") port, and/or the like. The network traffic between the network switch and the host computing system, in some embodiments, might be at least one of uni-directional network traffic, bi-directional network traffic, or split directional network traffic that originates from at least one of one or more of the plurality of client ports or one or more network ports. According to some embodiments, the one or more characteristics of the received network traffic might comprise at least one of one or more attributes of an Ethernet frame, one or more media access control ("MAC") source addresses, one or more MAC destination addresses, one or more Internet Protocol ("IP") source addresses, one or more IP destination addresses, one or more transmission control protocol ("TCP") source ports, one or more TCP destination ports, one or more priority bits, one or more particular bit patterns, bandwidth of a flow, one or more switch ports, one or more ingress ports, one or more Ethernet type identifiers, one or more virtual local area network ("VLAN") identifiers, one or more network protocol identifiers, or one or more action instructions, and/or the like.

In another aspect, a gateway device might comprise a transceiver, a plurality of client ports, and a network switch communicatively coupled to the transceiver and to each of the plurality of client ports. The network switch might receive network traffic, at least a portion of the network traffic being directed from the transceiver to a client device via the network switch and a corresponding client port among the plurality of client ports; route the network traffic to a host computing system; and forward one or more virtual network functions ("VNFs") to the host computing system, the one or more VNFs being selected by the host computing system based at least in part on one or more characteristics of the at least a portion of the network traffic that is directed to the client device.

In some embodiments, the gateway device might further comprise the host computing system. Alternatively, or additionally, the gateway device might comprise a host port. In some cases, the host computing system might communicatively couple with the network switch via the host port. According to some embodiments, the host computing system might comprise at least one of an x86 host computing device or an advanced reduced instruction set computer ("RISC") machine ("ARM") computing device, and/or the like. In some cases, the host computing system comprises one or more computing cores (preferably, two or more computing cores).

According to some embodiments, the network switch and the host computing system might be under control of at least one of a network functions virtualization ("NFV") entity or a software defined network ("SDN") controller. The NFV entity, in some instances, might comprise at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator, and/or the like. In some embodiments, the network switch might be a virtual network switch that utilizes a network switch VNF to provide network switching functionality. In some cases, the transceiver might likewise be a virtual transceiver that utilizes a transceiver VNF to provide transceiver functionality.

Merely by way of example, in some embodiments, the gateway device might be selected from a group consisting of a customer premises equipment ("CPE"), a router, a switch, a network element, a demarcation device, a WiFi gateway device, a hypervisor platform, and one or more virtual machine-based host machines, and/or the like. The CPE, in some cases, might comprise at least one of an optical network terminal ("ONT"), a network interface device ("NID"), an enhanced NID ("eNID"), a residential gateway ("RG") device, a business gateway ("BG") device, or a virtual gateway ("vG") device, and/or the like, and the gateway device might be located at or near a customer premises associated with a user of the client device. According to some embodiments, each of the plurality of client ports might comprise one of a local area network ("LAN") port, a Wi-Fi port, an advanced technology attachment ("ATA") port, a serial ATA ("SATA") port, an external SATA ("eSATA") port, a powered eSATA ("eSATAp") port, a mini SATA ("mSATA") port, a SATA Express port, a M.2 port, or a universal serial bus ("USB") port, and/or the like.

In yet another aspect, a system might comprise a network switch, a host computing system, and at least one of a network functions virtualization ("NFV") entity or a software defined network ("SDN") controller. The at least one of the NFV entity or the SDN controller controlling: the network switch to route network traffic, at least a portion of which is directed to a client device via the network switch and a corresponding client port among a plurality of client ports, to the host computing system; the host computing system to select one or more virtual network functions ("VNFs"), based at least in part on one or more characteristics of the received network traffic; and the network switch to forward at least one VNF of the selected one or more VNFs to the host computing system, the at least one VNF being selected by the host computing system based at least in part on one or more characteristics of the at least a portion of the network traffic that is directed to the client device.

In some embodiments, the NFV entity might comprise at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator, and/or the like. In some cases, the host computing system and the network switch might be disposed within a single gateway device. Alternatively, or additionally, the host computing system (or a second host computing system) might be located external to a gateway device in which the network switch is disposed, the gateway device might comprise a host port, and the host computing system might communicatively couple to the network switch via the host port. In some instances, the host computing system might host an instantiated network functions virtualization infrastructure ("NFVI") system.

According to some embodiments, each of the plurality of client ports might comprise one of a local area network ("LAN") port, a Wi-Fi port, an advanced technology attachment ("ATA") port, a serial ATA ("SATA") port, an external SATA ("eSATA") port, a powered eSATA ("eSATAp") port, a mini SATA ("mSATA") port, a SATA Express port, a M.2 port, or a universal serial bus ("USB") port, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-7 illustrate some of the features of the method, system, and apparatus for implementing network enhanced gateway functionality, and, in particular embodiments, to methods, systems, apparatus, and computer software for implementing network enhanced gateway functionality using network functions virtualization ("NFV") and/or software defined networks ("SDNs"), as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

With reference to the figures, FIG. 1A is a schematic diagram illustrating a system 100 for implementing network enhanced gateway functionality, in accordance with various embodiments. In FIG. 1A, system 100 might comprise a gateway device 105, which might include, without limitation, a switch 110, at least one transceiver 115, and one or more client ports 120, and/or the like. In some cases, the gateway device 105 might further comprise one or more computing systems 125a. Alternatively, or additionally, the gateway device 105 might further comprise one or more host ports 130, each communicatively coupled to one or more external computing systems 125b. The one or more computing systems 125a and the one or more external computing systems 125b are collectively referred to herein as "computing systems 125" or "host computing systems 125."

In some embodiments, the host computing systems 125 might each comprise at least one of an x86 host computing device or an advanced reduced instruction set computer ("RISC") machine ("ARM") computing device, and/or the like. In some cases, the host computing systems 125 might each comprise one or more computing cores, preferably two or more computing cores. In some instances, at least one first computing core might perform functions of a gateway device, while at least one second computing core might perform hypervisor functions to support virtual network functions ("VNFs"). In some embodiments, supporting VNFs might include, without limitation, at least one of generating VNFs, configuring VNFs, instantiating VNFs, modifying VNFs, sending VNFs to particular network and/or computing locations, bursting VNFs in particular network and/or computing locations, removing VNFs from particular network and/or computing locations, replacing VNFs, providing complementary other VNFs to complement or supplement functions of the VNF, and/or the like.

Figure 2:
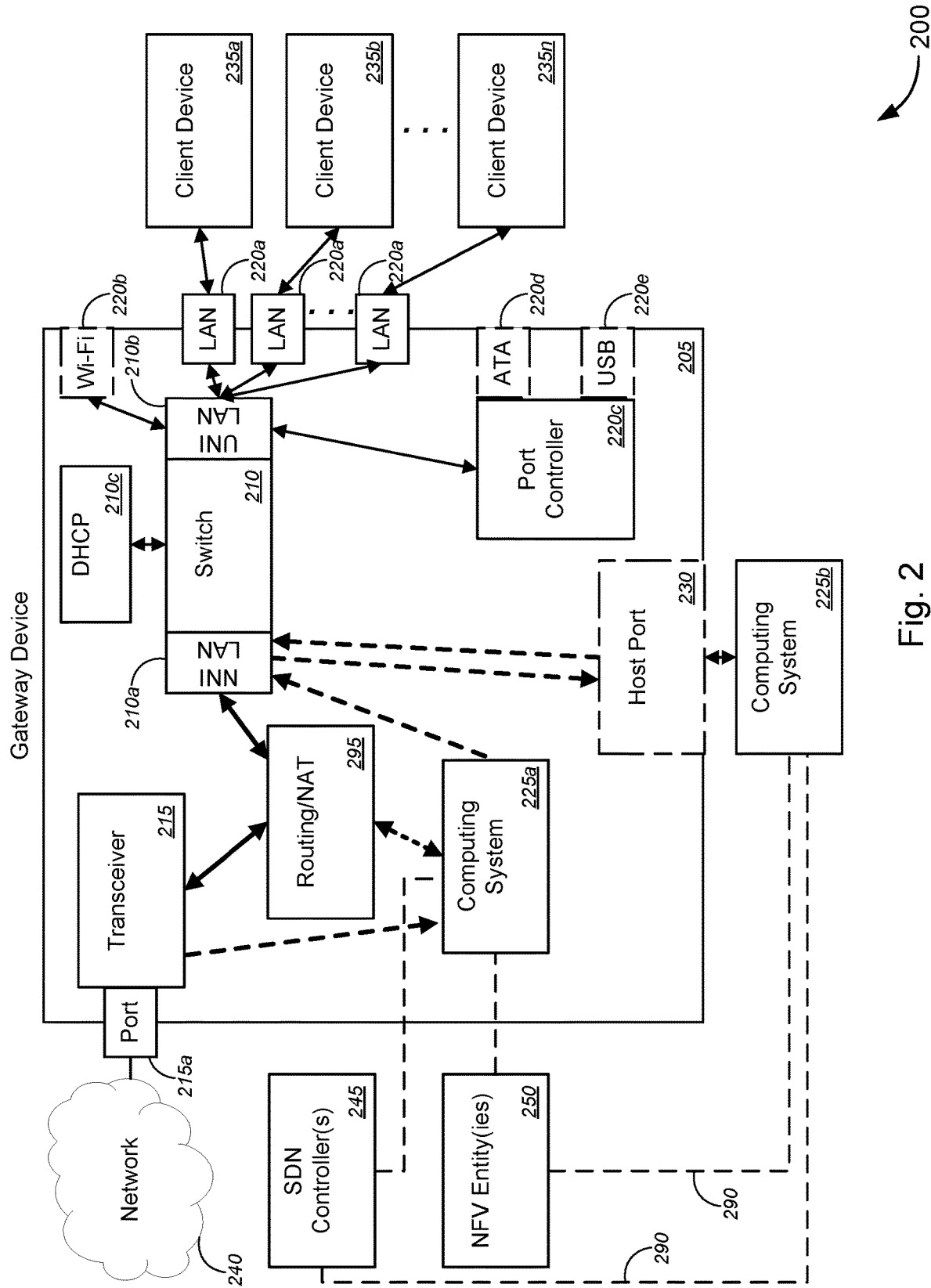
FIG. 2 is a schematic diagram illustrating another system for implementing network enhanced gateway functionality, in accordance with various embodiments.
Figure 3:
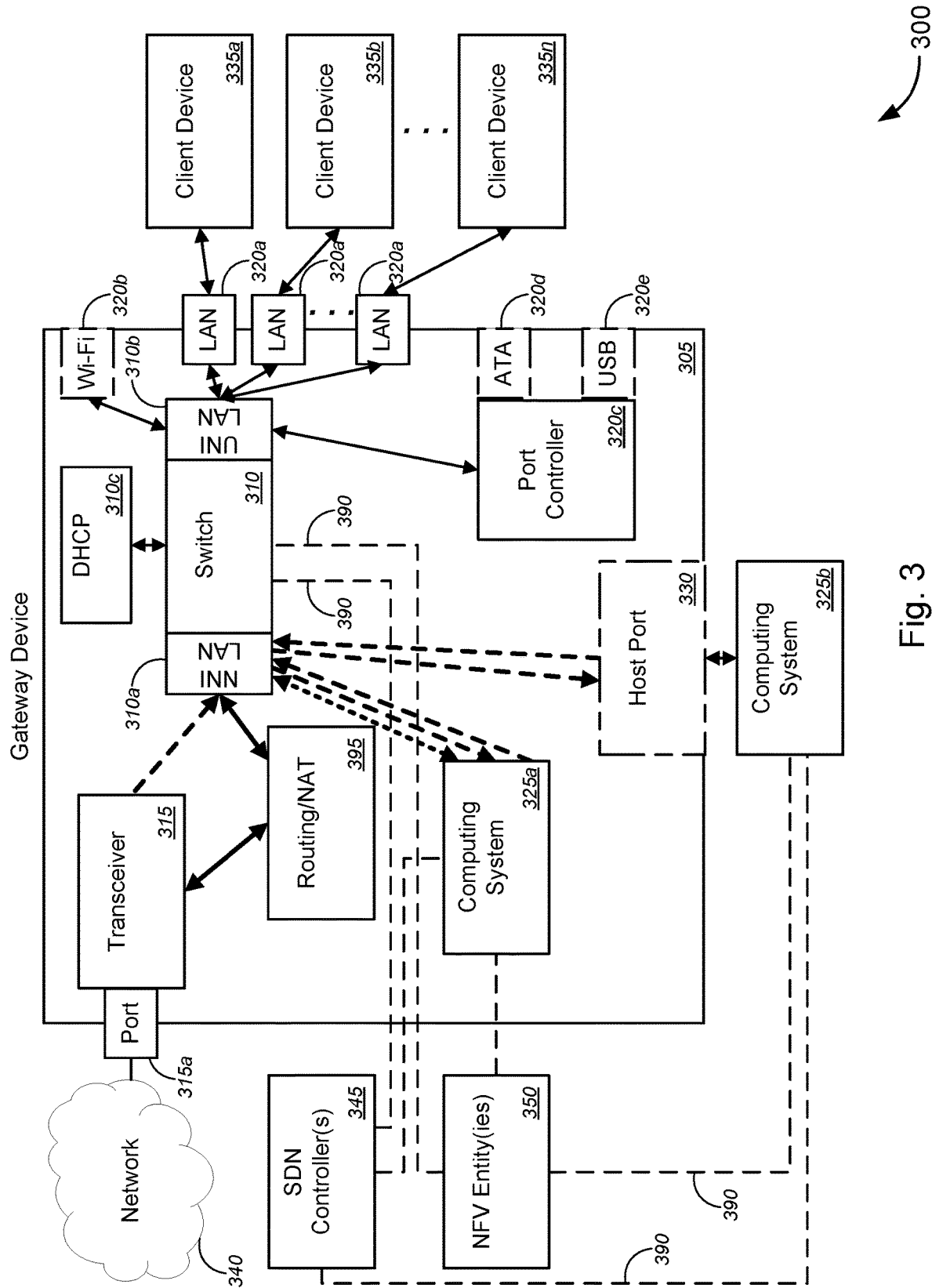
FIG. 3 is a schematic diagram illustrating yet another system for implementing network enhanced gateway functionality, in accordance with various embodiments.
Figure 4:
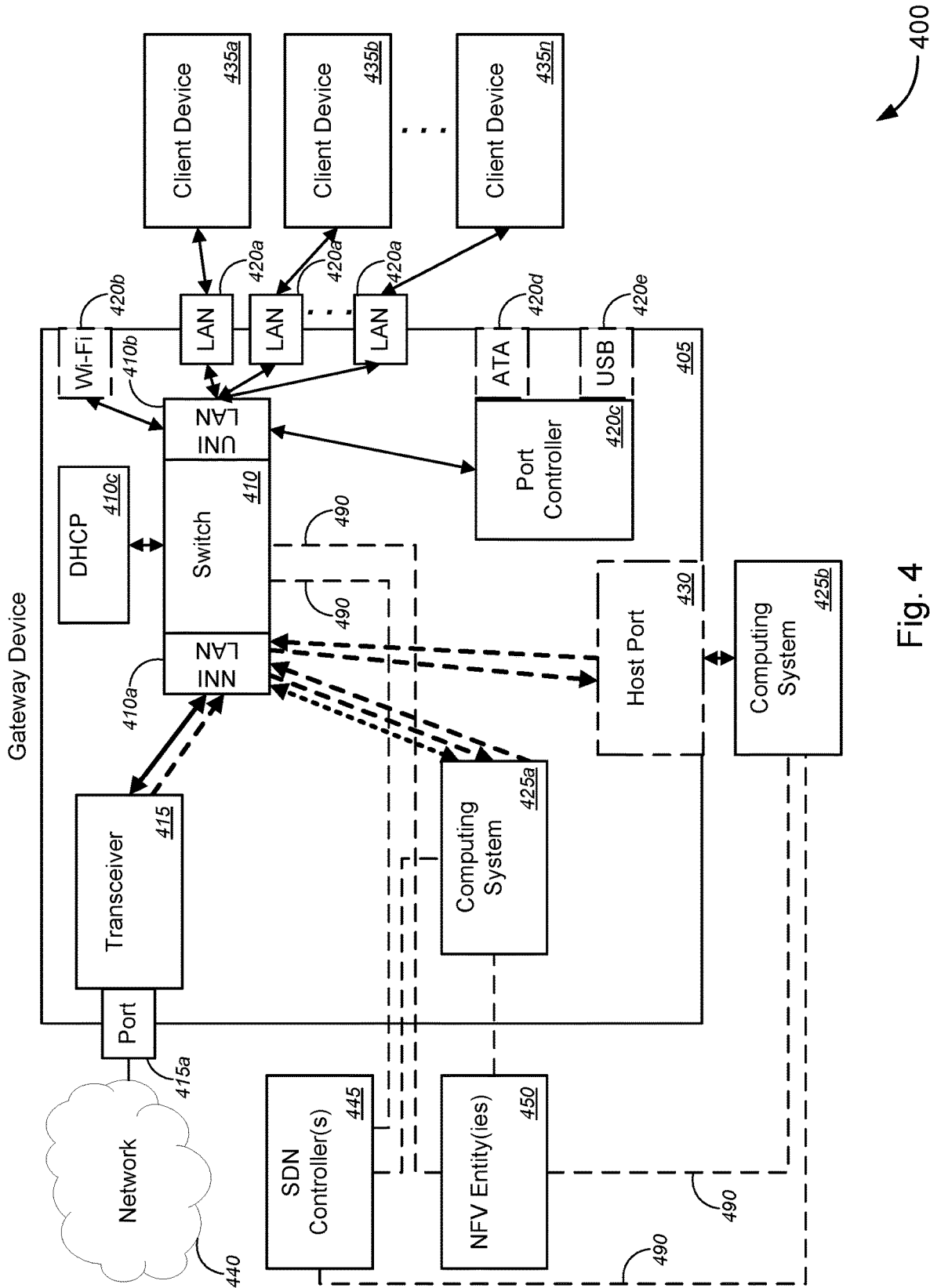
FIG. 4 is a schematic diagram illustrating still another system for implementing network enhanced gateway functionality, in accordance with various embodiments.

According to some embodiments, the switch 110 might communicatively couple to two or more of the following components: the at least one transceiver 115, the one or more client ports 120, the one or more computing systems 125a, and/or the one or more host ports 130, and/or the like. In some cases, the transceiver 115 might directly couple with the one or more computing systems 125a. In some embodiments, each of the plurality of client ports 120 might comprise one of a local area network ("LAN") port, a Wi-Fi port, an advanced technology attachment ("ATA") port, a serial ATA ("SATA") port, an external SATA ("eSATA") port, a powered eSATA ("eSATAp") port, a mini SATA ("mSATA") port, a SATA Express port, a M.2 port, or a universal serial bus ("USB") port, and/or the like. In some cases, the network switch 110 might be an Ethernet switch or a LAN switch that connects one or more LAN segments (typically, but not limited to, one of WiFi and one for the physical LAN ports, and/or the like). In some embodiments, the network switch 110 can be a physical switch or a virtual switch. In some cases, the network switch 110 might be a virtual network switch that utilizes a network switch VNF to provide network switching functionality. According to some embodiments, gateway device 105 might comprise a dynamic host configuration protocol ("DHCP"), which is a client/server protocol that automatically assigns Internet Protocol ("IP") addresses for the LAN so that computing and/or client devices can communicate. The DHCP (which is depicted in FIGS. 2-4 as DHCP 210c, 310c, and 410c, respectively) is a function that can be embodied as a physical component or as a virtual one; in some cases, a DHCP might be a virtual DHCP that utilizes a DHCP VNF to provide DHCP functionality. In some instances, the transceiver 115 might be a virtual transceiver that utilizes a transceiver VNF to provide transceiver functionality.

In some embodiments, system 100 might further comprise one or more client devices 135 that may be communicatively coupled to switch 110 each via a corresponding client port of the one or more client ports 120. The one or more client devices 135, according to some embodiments, might include, without limitation, a user device including, but not limited to, one of a tablet computer 135a, a smart phone 135b, a mobile phone 135c, a portable gaming device 135d, a laptop computer 135e, or a desktop computer 135f, and/or the like. In some instances, the client device 135 might comprise a device 135g, including, without limitation, a small form factor pluggable ("SFP") device, an enhanced SFP ("SFP+") device, a compact SFP ("CSFP") device, a gigabit interface converter ("GBIC"), a universal serial bus ("USB") pluggable device, and/or the like. At least one of the SFP device, the SFP+ device, or the CSFP device might comprise at least one of a SFP network interface device ("NID"), a SFP router, a SFP modem, or a SFP wireless access point, and/or the like. The USB pluggable device might comprise one of a printer, a scanner, a combination printer/scanner device, an external hard drive, a camera, a keyboard, a mouse, a drawing interface device, or a mobile device, and/or the like. For each of these client devices 135, a corresponding or compatible one or more of the above-mentioned client ports 120 would serve as an interface(s) between the particular client device 135 (or type of client device) and the network switch 110.

In some cases, system 100 might further comprise network 140a, which might communicatively couple to the gateway device 105 via the at least one transceiver 115, and might also communicatively couple to the Internet 140b. System 100 might further comprise one or more network functions virtualization ("NFV") entities and/or a software defined network ("SDN") controller 145. In some embodiments, the one or more NFV entities might include, but are not limited to, at least one of a NFV resource manager 150, a network functions virtualization infrastructure ("NFVI") system 155, a NFV orchestrator 160, a NFV management and orchestration ("MANO") system 165, a VNF manager 170, a virtualized infrastructure manager ("VIM") 175, and/or other NFV entities 180, and/or the like. In some cases, the other NFV entities 180 might include, without limitation, a virtual machine ("VM"), a macro orchestrator, or a domain orchestrator, and/or the like. As shown in FIG. 1A, multiple NFV entities might communicatively couple with each other (as depicted by dash lines 185 interconnecting the NFV resource manager 150, the NFVI 155, and the NFV orchestrator 160 in FIG. 1).

Although FIG. 1A depicts the one or more NFV entity(ies) 150-180 as being located in the network 140a, the various embodiments are not so limited, and the one or more NFV entity(ies) 150-180 may be located in a network (such as network 140a or the like), located in the gateway device 105, or distributed between both the network and the gateway device 105, and/or the like. For example, in some embodiments, the host computing system might host an instantiated network functions virtualization infrastructure ("NFVI") system. In some instances, the computing system 125 might register with the NFV orchestrator 160 (or other NFV entity) so that its capabilities are known to the NFV orchestrator 160 (or other NFV entity) and/or to the VIM 175. According to some embodiments, the network switch 110 and the computing system 125 are under control of at least one of the one or more NFV entities and/or the SDN controller 145 (as indicated by the long-dash lines denoted 190 in FIG. 1A). For SDN control, the SDN controller 145 might utilize a communications protocol, such as OpenFlow or other protocol, or the like, that gives access to the forwarding plane of a network switch or router over a network.

In some instances, at least one of the SFP device, the SFP+ device, or the CSFP device (collectively, "SFPs") might be used at not only the client side (as described above), but also at the network side, in which case, the SFPs might interface with corresponding ports in the transceiver, to handle communications or data to or from the network 140a. In some cases, on the network side, the SFPs might terminate a direct fiber or a passive optical network ("PON"), which would be at the physical layer of the network. On the client side, the SFPs can be used to connect the physical layer terminating device to the gateway device. In some embodiments, an SFP can also be used in a similar way as a USB port.

Merely by way of example, according to some embodiments, the gateway device 105 might include, without limitation, one of a customer premises equipment ("CPE"), a router, a switch, a network element, a demarcation device, a WiFi gateway device, a hypervisor platform, one or more virtual machine-based host machines, and/or the like. In some embodiments, the one or more virtual machine-based host machines might include, without limitation, a kernel-based virtual machine ("KVM")-based host machine, an ESX-based host machine, an ESXi-based host machine, and/or the like. In some instances, the CPE might include, but is not limited to, at least one of an optical network terminal ("ONT"), a network interface device ("NID"), an enhanced NID ("eNID"), a residential gateway ("RG") device, a business gateway ("BG") device, or a virtual gateway ("vG") device (which could be a vRG, a vBG, or other virtual gateway, and the like). In such cases, the gateway device might be located at or near a customer premises associated with a user of the client device. The NID, in some instances, might be a fiber-fed terminating device, a copper-fed terminating device, or a combination fiber-fed and copper-fed terminating device, and the like. In some embodiments, the gateway device 105 might be an integrated device that terminates the physical layer access line and the gateway (e.g., RG, BG, vG, etc.) in one container or box. In some cases, the gateway device 105 and/or the one or more computing systems 125 might include, without limitation, a VMware Host (which, in some instances, might comprise a bare metal/plastic host or a compute bus on a node, and the like) or a Linux container (as Linux has the ability to create a "virtual host" or soft host as part of the entire NID operating system).

In some cases, the transceiver 115 might comprise a network port (e.g., port 215a, 315a, or 415a, as shown in FIGS. 2-4, respectively, or the like). In some embodiments, the network port might include, without limitation, a SFP port to which an ONT SFP or a digital subscriber line ("DSL") Modem SFP might interface, connect, or couple. In such embodiments, the DSL Modem SFP might terminate the physical DSL technologies (sometimes referred to generally as "xDSL") line or the like. In other embodiments, the ONT SFP might terminate the physical passive optical network or direct point-to-point technologies. Other types of SFP transceivers might also comprise a specific type of transceivers for, but not limited to, wireless transceivers like LTE transceivers, 5G transceivers, and/or the like, or even cable modem transceivers. In some cases, the network port might include at least one of one or more optical SFP ports to which fiber cables can connect with corresponding optical SFP ports on an external ONT, one or more copper cable-based SFP ports to which copper cables can connect with corresponding copper cable-based SFP ports on the external ONT, one or more RJ-45 ports to which copper RJ-45 cables can connect with corresponding RJ-45 ports on the external ONT, and/or the like.

Merely by way of example, in some embodiments, the client ports 120 might each be a very high speed port that can handle traffic from multiple client devices 135, and in fact has to be fast enough in terms of network speed to handle all traffic from the network port (e.g., network DSL port, PON port, or the like), through the external host computing system 125b, via the gateway device 105, and to the client devices 135, and vice versa. For similar reasons, the host port 130 is, in some embodiments, a very high speed port that handles traffic to and from the external host computing system 125b.

In operation, the network switch 110, which is disposed within the gateway device 105, might route network traffic to a host computing system 125, at least a portion of the network traffic being originally directed to a client device 135 via the network switch 110 and via a corresponding client port 120 among a plurality of client ports 120. Based at least in part on one or more characteristics of the at least a portion of the network traffic that is directed to the client device 135, the host computing system 125 selects one or more VNFs. In some embodiments, the NFV orchestrator 160 or other NFV entity 150-180 might send the selected one or more VNFs to the host computing system 125, via the network switch 110. Alternatively, or additionally, for client devices 135 that are NFV-capable (including, but not limited to, set-top boxes, local Internet of Things ("IoT") controllers, IoT endpoints, and/or the like), the host computing system 125 might send one or more second VNFs (which might be based on the selected one or more VNFs or might be the same as the selected one or more VNFs) to the client devices 135—or otherwise provides the client devices 135 with access to the one or more VNFs—via the network switch 110 and corresponding client port 120. In some cases, the one or more characteristics of the received network traffic might comprise at least one of one or more attributes of an Ethernet frame, one or more media access control ("MAC") source addresses, one or more MAC destination addresses, one or more Internet Protocol ("IP") source addresses, one or more IP destination addresses, one or more transmission control protocol ("TCP") source ports, one or more TCP destination ports, one or more priority bits, one or more particular bit patterns, bandwidth of a flow, one or more switch ports, one or more ingress ports, one or more Ethernet type identifiers, one or more virtual local area network ("VLAN") identifiers, one or more network protocol identifiers, or one or more action instructions, and/or the like.

According to some embodiments, as described above, the network switch 110 and the host computing system 125 are under control of a NFV entity 150-180 and/or a SDN controller 145, which provide network enhanced gateway functionalities to the gateway device, as described herein. The network traffic between the network switch 110 and the host computing system 125, in some embodiments, is at least one of uni-directional network traffic, bi-directional network traffic, or split directional network traffic that originates from at least one of one or more of the plurality of client ports 120 or one or more network ports (which might couple with the transceiver 115). For example, the network traffic might be sent in a uni-directional manner from the network side (i.e., from network 140a and received by transceiver 115) to the client side (i.e., to the client device(s) 135 via client port 120), or vice versa. Alternatively, or additionally, the network traffic might be sent bi-directionally, with some portion of the network traffic flowing from the network side to the client side, and some other portion of the network traffic flowing from the client side to the network side. Alternatively, or additionally, the network traffic might be sent in a split directional manner, in which the network traffic (or a portion thereof) is replicated and directed to more than one destination (where the destination can be at the network side or the client side). The network traffic can originate from either or both of the network side or the client side. In a particular embodiment (or set of embodiments), depending on the VNF being instantiated on the host computing system 125, the network traffic can be flowing to/from the network 140a and/or to/from the gateway device 105, and/or to/from the client device(s) 135. For example, a VNF could be a parental control function that blocks certain traffic from coming into the gateway device 105 from the network 140a. Another VNF may prioritize traffic in either direction. And so on. According to some embodiments, the functions of the network switch 110 can be enabled or disabled by the NFV orchestrator 160 (or other NFV entity). If the functions of the network switch 110 is disabled, the gateway device would function as a traditional or legacy gateway without the ability to run VNFs on the host computing system 125a and/or 125b. In other cases, a subscriber-side configuration portal or similar methods may allow a subscriber to disable the functions of the network switch and to cause the gateway device 105 to function in traditional or legacy mode. Likewise, the subscriber-side configuration portal or similar methods may allow the subscriber to enable the functions of the network switch 110 such that the gateway device 105 is able to run VNFs on the host computing system 125a and/or 125b.

Merely by way of example, in some embodiments, a customer can load a VNF onto the host compute platform of the computing system 125 or download the VNF from the network 140a. Alternatively, or additionally, a customer might be provided with access to the VNFs that may exist in the network that he or she is connected to or even third party networks that the customer may have IP connectivity to. For example, a customer may want filtering to occur in the network before network traffic hits his or her access line, to conserve bandwidth on his or her access line, and then execute a local VNF once the filtered traffic traverses the access line. In certain embodiments, the customer might want to service chain VNFs on the gateway device 105 with other VNFs that exist on the network. Here, "service chain" or "service chaining" might refer to implementing two or more VNFs to perform a particular function. In such embodiments, it may first be determined whether service chaining is required (e.g., if only one VNF is required, no service chaining is necessary) and, if so, the system (e.g., one or more of the NFV entities 150-180) might determine whether it is possible to service chain two or more VNFs together to provide a single network service—including, without limitation, identifying and locating each individual VNF to provide sub-functionalities of the desired network service, managing the VNFs so that they can be service chained together, and/or the like. Based on a determination that service chaining is required and that two or more VNFs can be service chained together to provide a single network service, the two or more VNFs may be service chained together to provide a single network service. In one non-limiting example, four or five VNFs (regardless of which NFV entity each VNF is provided from) might be service chained together to perform the functions of a network router. In similar fashion, any number of VNFs (from any combination of NFV entities) may be service chained to perform any desired or ordered function. Service chaining and the processes outlined above related to service chaining are described in greater detail in the '208, '280, and '309 applications, which have already been incorporated herein by reference in their entirety.

According to some embodiments, as described above, the NFV entity might be located in either the network side (e.g., in network 140a, as shown in FIG. 1A), in the gateway device 105 (not shown in FIG. 1A), or both (also not shown in FIG. 1A). For instance, a customer might want to control his or her devices directly, in which case, a portal in the network might be provided to the customer to access. This would mean that the request would go to the network where the VNF controller might act upon the request and might configure VNFs that are local to the gateway device 105. Alternatively, or additionally, the customer might be provided with tools to configure his or her local VNFs directly without having to go through a network portal. In one set of examples, a VNF that is a virtual instantiation of a micro-processor or micro-compute resource (such as a Raspberry PI or other similar compute resource, or the like) might provide such functionality, and can be loaded and/or configured by the customer when not connected to the network.

The gateway device 105, as described above, is capable of operating on its own, with the network switch 110 serving to provide the in-premises connectivity among computing and/or user devices in the customer premises (i.e., with the network switch 110 serving as a LAN switch or the like). In some embodiments, large switch connections (e.g., wide area network ("WAN")—like connections), uplink type connections, and/or the like, can be added to the network switch 110 to act as a service point on the local device (i.e., the gateway device 105). In some cases, the gateway device 105 can be embodied by a set-top box or the like (or a set-top box can be a client device that couples to the gateway device 105 via a client port 120), and the large switch connections can feed all client devices 135 that are communicatively coupled to the gateway device 105 (or set-top box) via the client ports 120, while providing sufficient, ample, or excess bandwidth, or the like.

Figure 1B:
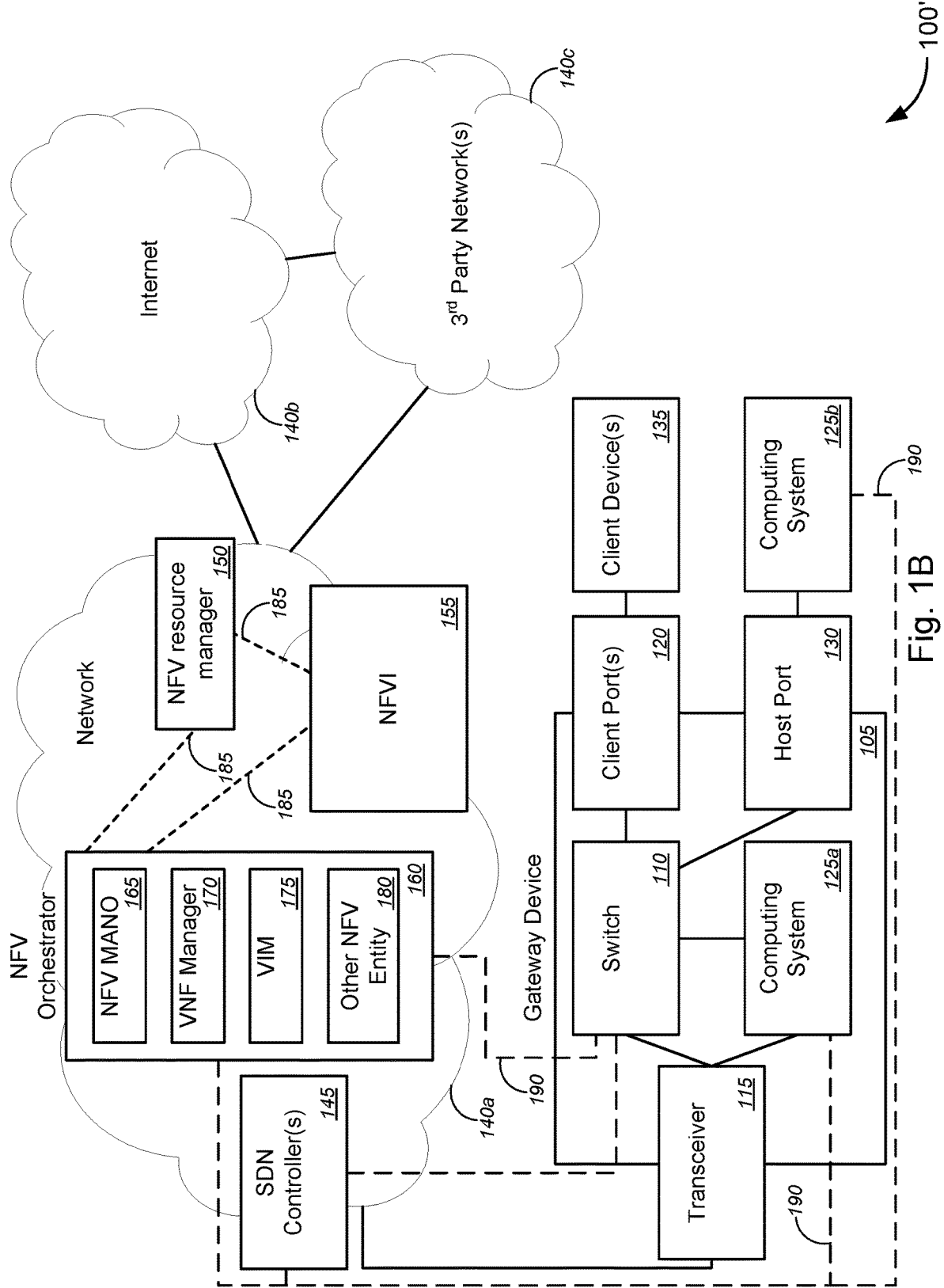
FIG. 1B is a schematic diagram illustrating an alternative system for implementing network enhanced gateway functionality, in accordance with various embodiments.

FIG. 1B is a schematic diagram illustrating an alternative system 100' for implementing network enhanced gateway functionality, in accordance with various embodiments. FIGS. 1A and 1B are collectively referred to as "FIG. 1." The embodiment of FIG. 1B is similar or identical to that of FIG. 1A, except that system 100' of FIG. 1B further comprises one or more third party networks 140c, which is communicatively coupled to one or both of network 140a and the Internet 140b. Each of the one or more third party networks 140c is associated with (i.e., controlled, operated, or owned by) a third party service provider that is different or separate from the service provider associated with the network 140a. In some embodiments, at least one third party network 140a might replicate, host, or instantiate content (i.e., data content, media content, VNFs, etc.) that are provided by either network 140a and/or the Internet 140b. In this manner, the network enhanced gateway device 105 may be serviced (in accordance with the embodiments as described above with respect to FIG. 1 and/or the embodiments as described below with respect to FIGS. 2-5) by network services that can be instantiated on either a private cloud or a public cloud by either the service provider associated with network 140a or a third party service provider associated with at least one of the third party networks 140c. In other words, a customer can subscribe to services offered by either the service provider associated with the network 140a or one or more third party service providers associated with the third party network 140c, or both. Network traffic can be separated between the multiple networks 140 via virtual private networks ("VPNs") or other network routing mechanisms. In some instances, at least one of the third party networks 140c might be geographically separate from the network 140a (e.g., in a different part of the same country, in different countries in the same continent, or in different countries in different continents, etc.). In such cases, the third party networks 140c might allow functionalities of the network 140a (particularly, with respect to implementation of network enhanced gateway functionality) to be made portable should a customer choose to bring his or her network enhanced gateway device abroad, for example.

The embodiment of system 100' of FIG. 1B would otherwise function in a similar, if not identical, manner as that of system 100 of FIG. 1A, the descriptions of the various components and functionalities of system 100 would be applicable to the descriptions of the various components and functionalities of system 100' of FIG. 1B.

FIGS. 2-4 depict various embodiments of systems for implementing network enhanced gateway functionality. FIG. 2 is a schematic diagram illustrating a system 200 for implementing network enhanced gateway functionality, in accordance with various embodiments. In some embodiments, system 200 might provide static host connectivity. FIG. 3 is a schematic diagram illustrating a system 300 for implementing network enhanced gateway functionality, in accordance with various embodiments. In some embodiments, system 300 might be service-chaining-host-capable. FIG. 4 is a schematic diagram illustrating a system 400 for implementing network enhanced gateway functionality, in accordance with various embodiments. In some embodiments, system 400, as configured, may be used to provide network enhanced gateway functionality, while allowing for flexible implementation, and thus, in some cases, may be implemented by service providers as a "standard" type of node or platform.

Turning to FIG. 2, system 200, according to some embodiments, might comprise gateway device 205, which comprises network switch 210, transceiver 215, a plurality of client ports 220, one or more computing systems 225a, a host port(s) 230 communicatively coupled to one or more external computing systems 225b, and a routing/network access translation ("NAT") device 295, and/or the like. The network switch 210, in some embodiments, might comprise a network-to-network interface ("NNI") or NNI LAN 210a, a user network interface ("UNI") or UNI LAN 210b, and a dynamic host configuration protocol ("DHCP") device 210c. In some cases, the network switch 210, as well as each of the NNI or NNI LAN 210a, the UNI or UNI LAN 210b, and the DHCP 210c, might be virtual components that utilize VNFs or the like to provide the network switch functionality, as well as the NNI or NNI LAN functionality, the UNI or UNI LAN functionality, and the DHCP functionality.

In some embodiments, the transceiver 215 might comprise a network port 215a, which (as described above) might provide physical port connections. In some cases, the transceiver 215 might be a virtual component that utilizes VNFs or the like to provide transceiver functionality. The plurality of client ports, in some instances, might comprise at least one of one or more LAN ports 220a, one or more Wi-Fi ports 220b, one or more port controllers 220c, one or more advanced technology attachment ("ATA") ports 220d, one or more universal serial bus ("USB") ports 220e, and/or the like. In some cases, the one or more ATA ports 220d might each include, without limitation, a serial ATA ("SATA") port, an external SATA ("eSATA") port, a powered eSATA ("eSATAp") port, a mini SATA ("mSATA") port, a SATA Express port, and/or the like. The port controller 220c, in some embodiments, might control the ATA ports 220d and the USB ports 220e, and/or might otherwise serve as an interface between the UNI 210b of the network switch 210 and each of the ATA ports 220d and the USB ports 220e.

System 200 might further comprise one or more client devices 235a-235n (collectively, "client devices 235"), which each communicatively couples to one of the client ports 220. The network port 215a communicatively couples with network 240, receives network traffic from the network 240 to the gateway device 205 (and ultimately to the client device(s) 235), and sends network traffic to the network 240 from the gateway device 205 (and originally from the client device(s) 235).

In some embodiments, each of the one or more computing systems 225a and/or the one or more external computing systems 225b (collectively, "host computing systems 225") might be controlled by one or both of SDN controller(s) 245 and/or one or more NFV entities 250 (denoted by long dash lines 290 connecting the SDN controller(s) 245 with each host computing system 225 and also connecting the one or more NFV entities 250 with each host computing system 225).

In operation, network traffic from the network 240 might be received by transceiver 215 via network port 215a. Transceiver 215 might communicate with the NNI or NNI LAN 210a of the network switch via the routing/NAT device 295 (which might be a virtual routing/NAT component that utilizes VNFs to provide routing/NAT functionality) (as depicted by the bold double-headed solid arrows in FIG. 2). The routing/NAT function/device 295 might communicate with the computing system 225a (as depicted by the bold, double-headed short dash arrow in FIG. 2) to route network traffic from the transceiver to the NNI or NNI LAN 210a of the network switch 225a, through the network switch 210, via the UNI or UNI LAN 210b and via one or more of the plurality of client ports, to corresponding one or more client devices 235 (as depicted by the bold, single-headed dash arrows in FIG. 2). Alternatively or additionally, the network traffic might be routed from the transceiver 215, through the routing/NAT function/device 295, via the NNI or NNI LAN 210a and via host port 230, to the one or more external computing systems 225b, back from the one or more external computing systems 225b to the NNI or NNI LAN 210a, through the network switch 210, via the UNI or UNI LAN 210b and via one or more of the plurality of client ports, to corresponding one or more client devices 235 (as depicted by the bold, single-headed dash arrows in FIG. 2). Although FIG. 2 shows a single direction (particularly, from the transceiver 215 to the computing system 225a to the NNI or NNI LAN 210a), the various embodiments are not so limited, and network traffic may flow uni-directionally from/to the network 240 to/from the client device(s) 235 via the network switch 210 and other components, bi-directionally from/to the network 240 to/from the client device(s) 235 via the network switch 210 and other components, and split-directionally from/to the network 240 to/from the client device(s) 235 via the network switch 210 and other components, and/or the like (as described above with respect to FIG. 1).

According to some embodiments, when a host computing system (or a host port) is added to the gateway device, the host can be handed over to a NFV Orchestrator ("NFVO") or other NFV entity for VNF life cycle management and/or for service management. In such a case, the "network configuration" of the gateway device might not pass to the NFVO or other NFV entity. Only the host is passed to the NFVO or other NFV entity, in which case its configuration may be limited in terms of changing the service path (i.e., NFV forwarding graph flexibility may be limited), resulting in a "host-on-a-stick" configuration.

In FIG. 2, gateway device 205, network switch 210, transceiver 215, client ports 220, computing system(s) 225a, computing system(s) 225b, host port 230, client device(s) 235, network 240, SDN controller(s) 245, NVF entities 250 of system 200 might correspond to (and are otherwise similar, if not identical, to) gateway device 105, network switch 110, transceiver 115, client ports 120, computing system(s) 115a, computing system(s) 115b, host port 130, client device(s) 135, network 140a, 140b, and/or 140c, SDN controller(s) 145, NVF entities 150 or system 100, respectively, and the descriptions of these components of system 100 similarly apply to the corresponding components of system 200. The operation of system 200 is otherwise similar, if not identical, to that of system 100, as described in detail above.

With reference to FIG. 3, system 300, according to some embodiments, might comprise gateway device 305, which comprises network switch 310, transceiver 315, a plurality of client ports 320, one or more computing systems 325a, a host port(s) 330 communicatively coupled to one or more external computing systems 325b, and a routing/network access translation ("NAT") device 395, and/or the like. The network switch 310, in some embodiments, might comprise a network-to-network interface ("NNI") or NNI LAN 310a, a user network interface ("UNI") or UNI LAN 310b, and a dynamic host configuration protocol ("DHCP") device 310c. In some cases, the network switch 310, as well as each of the NNI or NNI LAN 310a, the UNI or UNI LAN 310b, and the DHCP 310c, might be virtual components that utilize VNFs or the like to provide the network switch functionality, as well as the NNI or NNI LAN functionality, the UNI or UNI LAN functionality, and the DHCP functionality.

In some embodiments, the transceiver 315 might comprise a network port 315a, which (as described above) might provide physical port connections. In some cases, the transceiver 315 might be a virtual component that utilizes VNFs or the like to provide transceiver functionality. The plurality of client ports, in some instances, might comprise at least one of one or more LAN ports 320a, one or more Wi-Fi ports 320b, one or more port controllers 320c, one or more advanced technology attachment ("ATA") ports 320d, one or more universal serial bus ("USB") ports 320e, and/or the like. In some cases, the one or more ATA ports 320d might each include, without limitation, a serial ATA ("SATA") port, an external SATA ("eSATA") port, a powered eSATA ("eSATAp") port, a mini SATA ("mSATA") port, a SATA Express port, and/or the like. The port controller 320c, in some embodiments, might control the ATA ports 320d and the USB ports 320e, and/or might otherwise serve as an interface between the UNI 310b of the network switch 310 and each of the ATA ports 320d and the USB ports 320e.

System 300 might further comprise one or more client devices 335a-335n (collectively, "client devices 335"), which each communicatively couples to one of the client ports 320. The network port 315a communicatively couples with network 340, receives network traffic from the network 340 to the gateway device 305 (and ultimately to the client device(s) 335), and sends network traffic to the network 340 from the gateway device 305 (and originally from the client device(s) 335).

In some embodiments, each of the one or more computing systems 325a, the one or more external computing systems 325b (collectively, "host computing systems 325"), and/or the network switch 310 might be controlled by one or both of SDN controller(s) 345 and/or one or more NFV entities 350 (denoted by long dash lines 390 connecting the SDN controller(s) 345 with each host computing system 325 and the network switch 310, and also connecting the one or more NFV entities 350 with each host computing system 325 and the network switch 310).

In operation, network traffic from the network 340 might be received by transceiver 315 via network port 315a. Transceiver 315 might communicate with the NNI or NNI LAN 310a of the network switch via the routing/NAT device 395 (which might be a virtual routing/NAT component that utilizes VNFs to provide routing/NAT functionality) (as depicted by the bold double-headed solid arrows in FIG. 3). Unlike the routing/NAT function/device 295 of FIG. 2, the routing/NAT function/device 395 does not directly communicate with the computing system 325a. Rather, the routing/NAT function/device 395 communicates with the computing system(s) 325a via the NNI or NNI LAN 310a (as depicted by the bold, double-headed short dash arrow in FIG. 3) to route network traffic from the transceiver to the NNI or NNI LAN 310a, to one or both of the one or more computing systems 325a and/or the one or more external computing systems 325b (via host port 330) (as depicted by the bold, single-headed dash arrows in FIG. 3) through the network switch 310, via the UNI or UNI LAN 310b and via one or more of the plurality of client ports, to corresponding one or more client devices 335. Although FIG. 3 shows a single direction (particularly, from the transceiver 315 to the NNI or NNI LAN 310a), the various embodiments are not so limited, and network traffic may flow uni-directionally from/to the network 340 to/from the client device(s) 335 via the network switch 310 and other components, bi-directionally from/to the network 340 to/from the client device(s) 335 via the network switch 310 and other components, and split-directionally from/to the network 340 to/from the client device(s) 335 via the network switch 310 and other components, and/or the like (as described above with respect to FIG. 1).

According to some embodiments, the system 300 might provide a platform that is fully flexible and map-able. For example, in some embodiments, a top of rack ("TOR") and/or an end of row ("EOR") switch might be added to the orchestration. In some cases, once the node is "handed over" from the network configuration system to the orchestrator with some default configuration that allows the customer to start up, the NFVO or other NFV entity might take full control of the node to map both the WAN and the LAN side connections to the VNF manager in both serial and parallel connectivity functions, thereby providing full NFV service management.

In FIG. 3, gateway device 305, network switch 310, transceiver 315, client ports 320, computing system(s) 325a, computing system(s) 325b, host port 330, client device(s) 335, network 340, SDN controller(s) 345, NVF entities 350 of system 300 might correspond to (and are otherwise similar, if not identical, to) gateway device 105, network switch 110, transceiver 115, client ports 120, computing system(s) 115a, computing system(s) 115b, host port 130, client device(s) 135, network 140a, 140b, and/or 140c, SDN controller(s) 145, NVF entities 150 or system 100, respectively, and the descriptions of these components of system 100 similarly apply to the corresponding components of system 300. The operation of system 300 is otherwise similar, if not identical, to that of system 100, as described in detail above.

With reference to FIG. 4, system 400, according to some embodiments, might comprise gateway device 405, which comprises network switch 410, transceiver 415, a plurality of client ports 420, one or more computing systems 425a, a host port(s) 430 communicatively coupled to one or more external computing systems 425b, and/or the like. The network switch 410, in some embodiments, might comprise a network-to-network interface ("NNI") or NNI LAN 410a, a user network interface ("UNI") or UNI LAN 410b, and a dynamic host configuration protocol ("DHCP") device 410c. In some cases, the network switch 410, as well as each of the NNI or NNI LAN 410a, the UNI or UNI LAN 410b, and the DHCP 410c, might be virtual components that utilize VNFs or the like to provide the network switch functionality, as well as the NNI or NNI LAN functionality, the UNI or UNI LAN functionality, and the DHCP functionality.

In some embodiments, the transceiver 415 might comprise a network port 415a, which (as described above) might provide physical port connections. In some cases, the transceiver 415 might be a virtual component that utilizes VNFs or the like to provide transceiver functionality. The plurality of client ports, in some instances, might comprise at least one of one or more LAN ports 420a, one or more Wi-Fi ports 420b, one or more port controllers 420c, one or more advanced technology attachment ("ATA") ports 420d, one or more universal serial bus ("USB") ports 420e, and/or the like. In some cases, the one or more ATA ports 420d might each include, without limitation, a serial ATA ("SATA") port, an external SATA ("eSATA") port, a powered eSATA ("eSATAp") port, a mini SATA ("mSATA") port, a SATA Express port, and/or the like. The port controller 420c, in some embodiments, might control the ATA ports 420d and the USB ports 420e, and/or might otherwise serve as an interface between the UNI 410b of the network switch 410 and each of the ATA ports 420d and the USB ports 420e.

System 400 might further comprise one or more client devices 435a-435n (collectively, "client devices 435"), which each communicatively couples to one of the client ports 420. The network port 415a communicatively couples with network 440, receives network traffic from the network 440 to the gateway device 405 (and ultimately to the client device(s) 435), and sends network traffic to the network 440 from the gateway device 405 (and originally from the client device(s) 435).

In some embodiments, each of the one or more computing systems 425a, the one or more external computing systems 425b (collectively, "host computing systems 425"), and/or the network switch 410 might be controlled by one or both of SDN controller(s) 445 and/or one or more NFV entities 450 (denoted by long dash lines 490 connecting the SDN controller(s) 445 with each host computing system 425 and the network switch 410, and also connecting the one or more NFV entities 450 with each host computing system 425 and the network switch 410).

In operation, network traffic from the network 440 might be received by transceiver 415 via network port 415a. In system 400 of FIG. 4, the routing/NAT function/device 295 and 395 of systems 200 and 300, respectively, are incorporated within the network switch 410 and/or the NNI or NNI LAN 410a, thereby streamlining network traffic routing. Thus, unlike systems 200 and 300, transceiver 415 might communicate with the NNI or NNI LAN 410a of the network switch directly (as depicted by the bold, solid double-headed arrow in FIG. 4) to route network traffic from the transceiver to the NNI or NNI LAN 410a, to one or both of the one or more computing systems 425a and/or the one or more external computing systems 425b (via host port 430) (as depicted by the bold, single-headed dash arrows in FIG. 4) through the network switch 410, via the UNI or UNI LAN 410b and via one or more of the plurality of client ports, to corresponding one or more client devices 435. In some cases, the NNI or NNI LAN 410a might communicate with the computing system(s) 425a to perform the routing function (as depicted by the bold, double-headed short dash arrow in FIG. 4). Although FIG. 4 shows a single direction (particularly, from the transceiver 415 to the NNI or NNI LAN 410a), the various embodiments are not so limited, and network traffic may flow uni-directionally from/to the network 440 to/from the client device(s) 435 via the network switch 410 and other components, bi-directionally from/to the network 440 to/from the client device(s) 435 via the network switch 410 and other components, and split-directionally from/to the network 440 to/from the client device(s) 435 via the network switch 410 and other components, and/or the like (as described above with respect to FIG. 1).

According to some embodiments, as described above, system 400, as configured, may be used to provide network enhanced gateway functionality, while allowing for flexible implementation, and thus, in some cases, may be implemented by service providers as a "standard" type of node or platform. In some embodiments, SDN controller(s) 445 and/or the NFV entities 450 might control the network switch 410 to route network traffic to/from transceiver 415 (from network 440 via network port 415a), via NNI or NNI LAN 410a and one or both of the one or more computing systems 425a and/or the one or more external computing systems 425b (via host port 430), to/from at least one of the plurality of client devices 435 (via UNI or UNI LAN 410b and via corresponding at least one client port 420). In some cases, for at least the portion of the network traffic being directed to the client device(s) 435, based on the characteristics of the at least the portion of the network traffic—including, but not limited to, at least one of one or more attributes of an Ethernet frame, one or more media access control ("MAC") source addresses, one or more MAC destination addresses, one or more Internet Protocol ("IP") source addresses, one or more IP destination addresses, one or more transmission control protocol ("TCP") source ports, one or more TCP destination ports, one or more priority bits, one or more particular bit patterns, bandwidth of a flow, one or more switch ports, one or more ingress ports, one or more Ethernet type identifiers, one or more virtual local area network ("VLAN") identifiers, one or more network protocol identifiers, or one or more action instructions, and/or the like—, the SDN controller(s) 445 and/or the NFV entities 450 might control the host computing system(s) 425a and/or 425b to select one or more VNFs, and to send the selected VNFs to the host computing system(s) 425a and/or 425b via the network switch 410, to the particular client device(s) 435 via the network switch 410 (and via the UNI or UNI LAN 410b and the corresponding client port(s) 420), or both, or to otherwise provide the host computing system(s) 425a and/or 425b and/or the particular client device(s) 435 with access to the selected VNFs. In some instances, the selected VNFs might be selected and sent to the network switch 410 (or access to the selected VNFs might otherwise be provided to the network switch 410). The selected VNFs might provide the particular client device(s) 425 (and/or or other component, including, but not limited to, the network switch 410, the one or more computing systems 425, the transceiver 415, the host port 430, the client port(s) 420, and/or the like) with one or more functions. In some embodiments, the one or more functions might include, without limitation, at least one of an activation function, an operation function, a deletion function, a specialized function, a firewall function, an Internet of Things ("IoT") proxy function, an application-related function, or an operations, administration, and management ("OAM") function, and/or the like. In some cases, the specialized function might itself be a VNF.

In FIG. 4, gateway device 405, network switch 410, transceiver 415, client ports 420, computing system(s) 425a, computing system(s) 425b, host port 430, client device(s) 435, network 440, SDN controller(s) 445, NVF entities 450 of system 400 might correspond to (and are otherwise similar, if not identical, to) gateway device 105, network switch 110, transceiver 115, client ports 120, computing system(s) 115a, computing system(s) 115b, host port 130, client device(s) 135, network 140a, 140b, and/or 140c, SDN controller(s) 145, NVF entities 150 or system 100, respectively, and the descriptions of these components of system 100 similarly apply to the corresponding components of system 400. The operation of system 400 is otherwise similar, if not identical, to that of system 100, as described in detail above.

Figure 5:
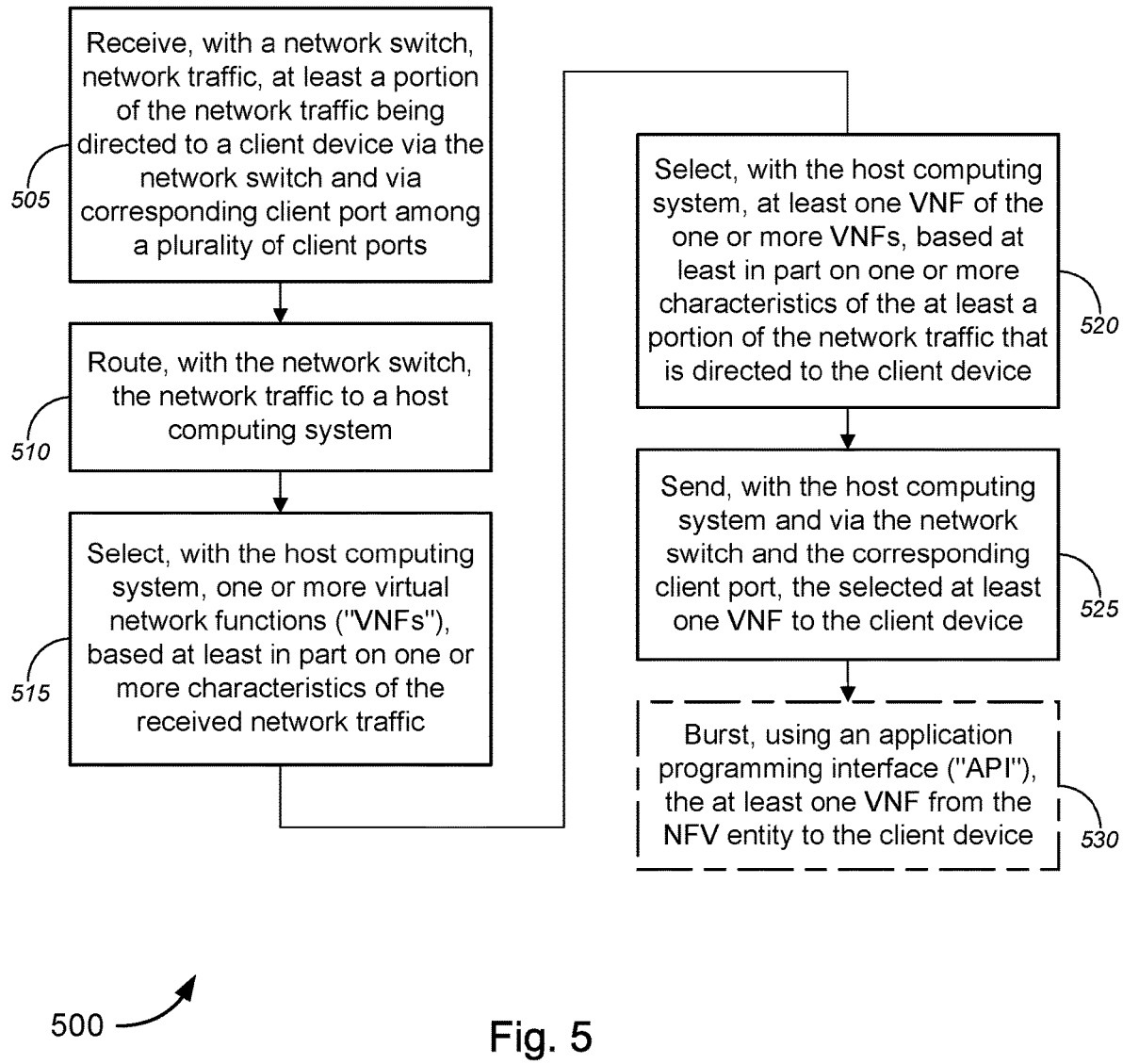
FIG. 5 is a flow diagram illustrating a method for implementing network enhanced gateway functionality, in accordance with various embodiments.

FIG. 5 is a flow diagram illustrating a method 500 for implementing network enhanced gateway functionality, in accordance with various embodiments. While the techniques and procedures are depicted and/or described in a certain order for purposes of illustration, it should be appreciated that certain procedures may be reordered and/or omitted within the scope of various embodiments. Moreover, while the method 500 illustrated by FIG. 5 can be implemented by or with (and, in some cases, are described below with respect to) the systems 100, 200, 300, and 400 of FIGS. 1, 2, 3, and 4, respectively (or components thereof), such methods may also be implemented using any suitable hardware (or software) implementation. Similarly, while each of the systems 100, 200, 300, and 400 of FIGS. 1, 2, 3, and 4, respectively (or components thereof), can operate according to the method 500 illustrated by FIG. 5 (e.g., by executing instructions embodied on a computer readable medium), the systems 100, 200, 300, and 400 of FIGS. 1, 2, 3, and 4 can each also operate according to other modes of operation and/or perform other suitable procedures.

In FIG. 5, method 500, at block 505 might comprise receiving, with a network switch (e.g., network switch 110, 210, 310, and/or 410 of FIGS. 1-4, or the like), network traffic. At least a portion of the network traffic might be (originally) directed to a client device (e.g., client device 135, 235, 335, and/or 435 of FIGS. 1-4, or the like) via the network switch and corresponding client port among a plurality of client ports (e.g., client port 120, 220, 320, and/or 420 of FIGS. 1-4, or the like). In some cases, the client device might comprise a user device including, without limitation, one of a tablet computer, a smart phone, a mobile phone, a portable gaming device, a laptop computer, or a desktop computer, and/or the like. Alternatively, the client device might include, but is not limited to, a device selected from a group consisting of a small form factor pluggable ("SFP") device, an enhanced SFP ("SFP+") device, a compact SFP ("CSFP") device, a gigabit interface converter ("GBIC"), and a universal serial bus ("USB") pluggable device, and/or the like. In some cases, at least one of the SFP device, the SFP+ device, or the CSFP device might include, without limitation, at least one of a SFP network interface device ("NID"), a SFP router, a SFP modem, or a SFP wireless access point. The USB pluggable device, in some instances, might include, but is not limited to, one of a printer, a scanner, a combination printer/scanner device, an external hard drive, a camera, a keyboard, a mouse, a drawing interface device, or a mobile device, and/or the like.

In some embodiments, each of the client ports might include, without limitation, one of a local area network ("LAN") port, a Wi-Fi port, an advanced technology attachment ("ATA") port, a serial ATA ("SATA") port, an external SATA ("eSATA") port, a powered eSATA ("eSATAp") port, a mini SATA ("mSATA") port, a SATA Express port, a M.2 port, or a universal serial bus ("USB") port, and/or the like. The network traffic between the network switch and the host computing system, in some embodiments, is at least one of uni-directional network traffic, bi-directional network traffic, or split directional network traffic that originates from at least one of one or more of the plurality of client ports or one or more network ports. In some instances, the network switch is a virtual network switch that utilizes a network switch VNF to provide network switching functionality. In some cases, the network switch might include at least one NNI or NNI LAN and at least one UNI or UNI LAN (e.g., NNI or NNI LAN 210a, 310a, and 410a of FIGS. 2-4, respectively, and UNI or UNI LAN 210b, 310b, and 410b of FIGS. 2-4, respectively), the NNI or NNI or NNI LAN receiving the network traffic and communicatively coupling with the host computing system, while the UNI or UNI or UNI LAN communicatively coupling with the client device via the corresponding client port of the plurality of client ports.

At block 510, method 500 might comprise routing, with the network switch, the network traffic to a host computing system. In some embodiments, the network switch and the host computing system are under control of a network functions virtualization ("NFV") entity, which might include, without limitation, at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator, and/or the like. In some cases, the host computing system and the network switch might be disposed within a single gateway device. Alternatively, the host computing system might be located external to a gateway device in which the network switch is disposed, the gateway device comprises a host port, and the host computing system communicatively couples to the network switch via the host port. In other alternative embodiments, one or more first host computing systems might be co-located with the network switch within the single gateway device, while one or more second host computing systems might be located external to the single gateway device and might communicatively couple to the network switch via the host port.

Merely by way of example, the host computing system might include, without limitation, an x86 host computing device, an ARM computing device, or both. In some embodiments, the host computing system might include, but is not limited to, one or more computing cores (preferably, two or more computing cores). In some cases, at least one first computing core might perform functions of a gateway device, while at least one second computing core might perform hypervisor functions to support VNFs.

According to some embodiments, the gateway device, in which the switch is disposed, might be selected from a group consisting of a customer premises equipment ("CPE"), a router, a switch, a network element, a demarcation device, a WiFi gateway device, a hypervisor platform, and one or more virtual machine-based host machines (which might include, without limitation, a kernel-based virtual machine ("KVM")-based host machine, an ESX-based host machine, an ESXi-based host machine, and/or the like), and/or the like. In some cases, the CPE might include, but is not limited to, one of a gateway device comprising at least one of an optical network terminal ("ONT"), a network interface device ("NID"), an enhanced NID ("eNID"), a residential gateway ("RG") device, a business gateway ("BG") device, or a virtual gateway ("vG") device, and/or the like, and the gateway device might be located at or near a customer premises associated with a user of the client device. The NID, in some instances, might be a fiber-fed terminating device, a copper-fed terminating device, or a combination fiber-fed and copper-fed terminating device, and the like. In some embodiments, the gateway device 105 might be an integrated device that terminates the physical layer access line and the gateway (e.g., RG, BG, vG, etc.) in one container or box. In some cases, the gateway device 105 and/or the one or more computing systems 125 might include, without limitation, a VMware Host (which, in some instances, might comprise a bare metal/plastic host or a compute bus on a node, and the like) or a Linux container (as Linux has the ability to create a "virtual host" or soft host as part of the entire NID operating system).

Method 500 might further comprise, at block 515, selecting, with the host computing system, one or more virtual network functions ("VNFs"), based at least in part on one or more characteristics of the received network traffic. According to some embodiments, the one or more characteristics of the received network traffic might include, but are not limited to, at least one of one or more attributes of an Ethernet frame, one or more media access control ("MAC") source addresses, one or more MAC destination addresses, one or more Internet Protocol ("IP") source addresses, one or more IP destination addresses, one or more transmission control protocol ("TCP") source ports, one or more TCP destination ports, one or more priority bits, one or more particular bit patterns, bandwidth of a flow, one or more switch ports, one or more ingress ports, one or more Ethernet type identifiers, one or more virtual local area network ("VLAN") identifiers, one or more network protocol identifiers, or one or more action instructions, and/or the like. In some cases, the one or more VNFs might provide the client device (or other component, including, but not limited to, the network switch, the one or more computing systems, the transceiver, the host port, the client port(s), and/or the like) with one or more functions, the one or more functions including, without limitation, at least one of an activation function, an operation function, a deletion function, a specialized function, a firewall function, an Internet of Things ("IoT") proxy function, an application-related function, or an operations, administration, and management ("OAM") function, and/or the like. At block 520, method 500 might comprise sending the one or more VNFs to the host computing system, in some cases, based at least in part on the one or more characteristics of the received network traffic.

In some embodiments, selecting the one or more VNFs might comprise selecting, with the host computing system, at least one VNF of the one or more VNFs, based at least in part on one or more characteristics of the at least a portion of the network traffic that is directed to the client device (optional block 525). At optional block 530, method 500 might further comprise sending, with the host computing system and via the network switch and the corresponding client port, the selected at least one VNF to the client device (e.g., a VNF-capable device, including, but not limited to, a set-top box, a local IoT controller, an IoT endpoint, and/or the like). According to some embodiments, sending, with the host computing system and via the network switch and the corresponding client port, the selected at least one VNF to the client device might comprise bursting, using an application programming interface ("API"), the at least one VNF from the NFV entity to the client device (optional block 535). In some embodiments, sending, with the host computing system and via the network switch and the corresponding client port, the selected at least one VNF to the client device might comprise otherwise providing the client device with access to the selected at least one VNF.

Exemplary System and Hardware Implementation

Figure 6:
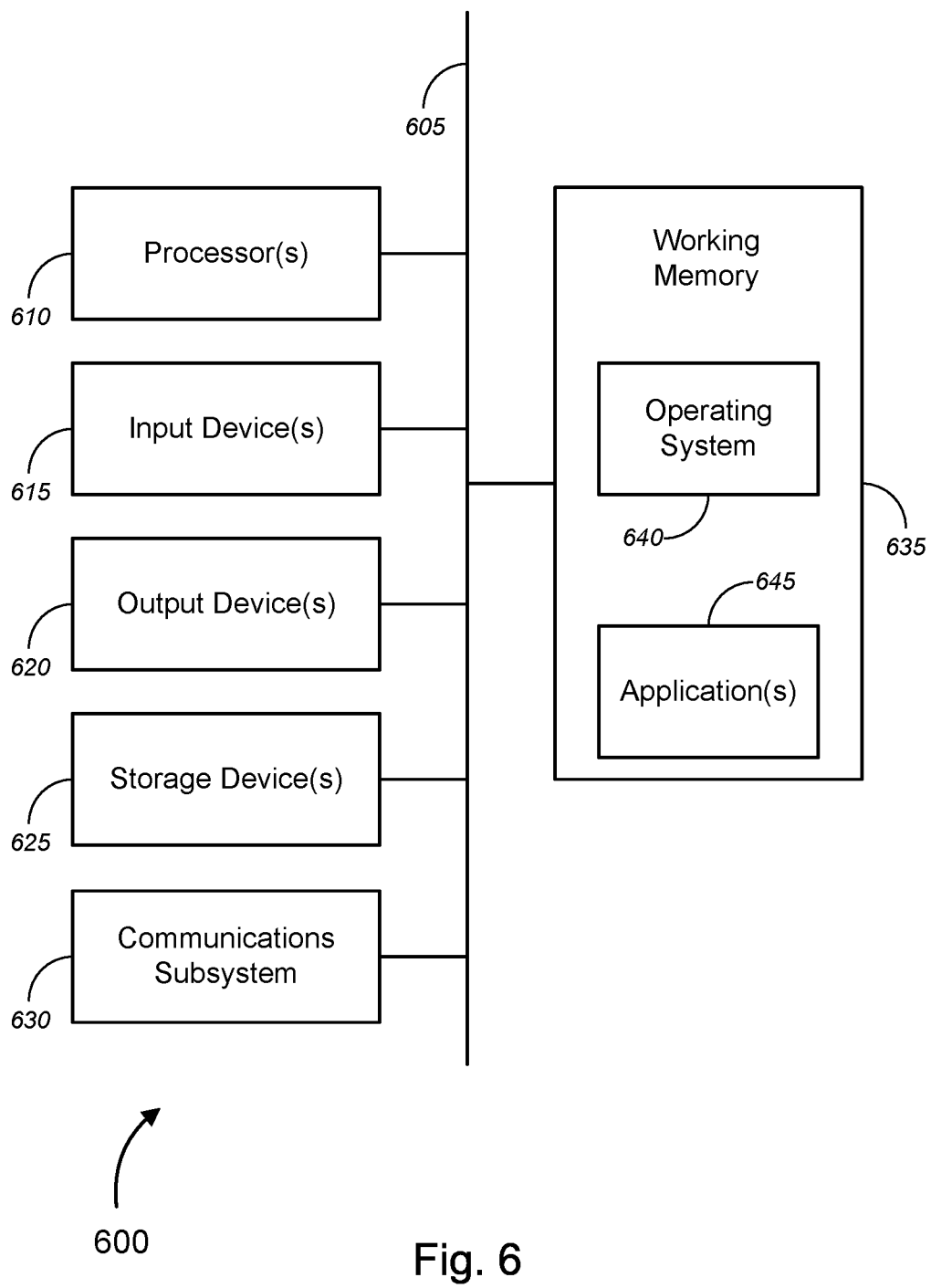
FIG. 6 is a block diagram illustrating an exemplary computer or system hardware architecture, in accordance with various embodiments.

FIG. 6 is a block diagram illustrating an exemplary computer or system hardware architecture, in accordance with various embodiments. FIG. 6 provides a schematic illustration of one embodiment of a computer system 600 of the service provider system hardware that can perform the methods provided by various other embodiments, as described herein, and/or can perform the functions of computer or hardware system (i.e., software defined network ("SDN") controllers 145, 245, 345, and 445, network functions virtualization ("NFV") entities (including, but not limited to, NFV resource manager 150, NFV Infrastructure ("NFVI") system 155, NFV orchestrator 160, NFV management and orchestration ("MANO") architectural framework or system 165, virtual network function ("VNF") manager 170, virtual infrastructure manager ("VIM") 175, other NFV entities 180, NFV entities 250, 350, and 450, and/or the like), gateway devices 105, 205, 305, and 405, switches 110, 210, 310, and 410, computing systems 125, 225, 325, and 425, and client devices 135, 235, 335, and 435, etc.), as described above. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer or hardware system 600—which might represent an embodiment of the computer or hardware system (i.e., SDN controllers 145, 245, 345, and 445, NFV entities (including, but not limited to, NFV resource manager 150, NFVI system 155, NFV orchestrator 160, NFV MANO architectural framework or system 165, VNF manager 170, VIM 175, other NFV entities 180, NFV entities 250, 350, and 450, and/or the like), gateway devices 105, 205, 305, and 405, switches 110, 210, 310, and 410, computing systems 125, 225, 325, and 425, and client devices 135, 235, 335, and 435, etc.), described above with respect to FIGS. 1-4—is shown comprising hardware elements that can be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and/or the like); one or more input devices 615, which can include, without limitation, a mouse, a keyboard, and/or the like; and one or more output devices 620, which can include, without limitation, a display device, a printer, and/or the like.

The computer or hardware system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 600 might also include a communications subsystem 630, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 630 may permit data to be exchanged with a network (such as the network described below, to name one example), with other computer or hardware systems, and/or with any other devices described herein. In many embodiments, the computer or hardware system 600 will further comprise a working memory 635, which can include a RAM or ROM device, as described above.

The computer or hardware system 600 also may comprise software elements, shown as being currently located within the working memory 635, including an operating system 640, device drivers, executable libraries, and/or other code, such as one or more application programs 645, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 600 and/or might take the form of source and/or installable code, which, upon compilation and/or installation on the computer or hardware system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 600) to perform methods in accordance with various embodiments of the invention. According to a set of embodiments, some or all of the procedures of such methods are performed by the computer or hardware system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

Figure 7:
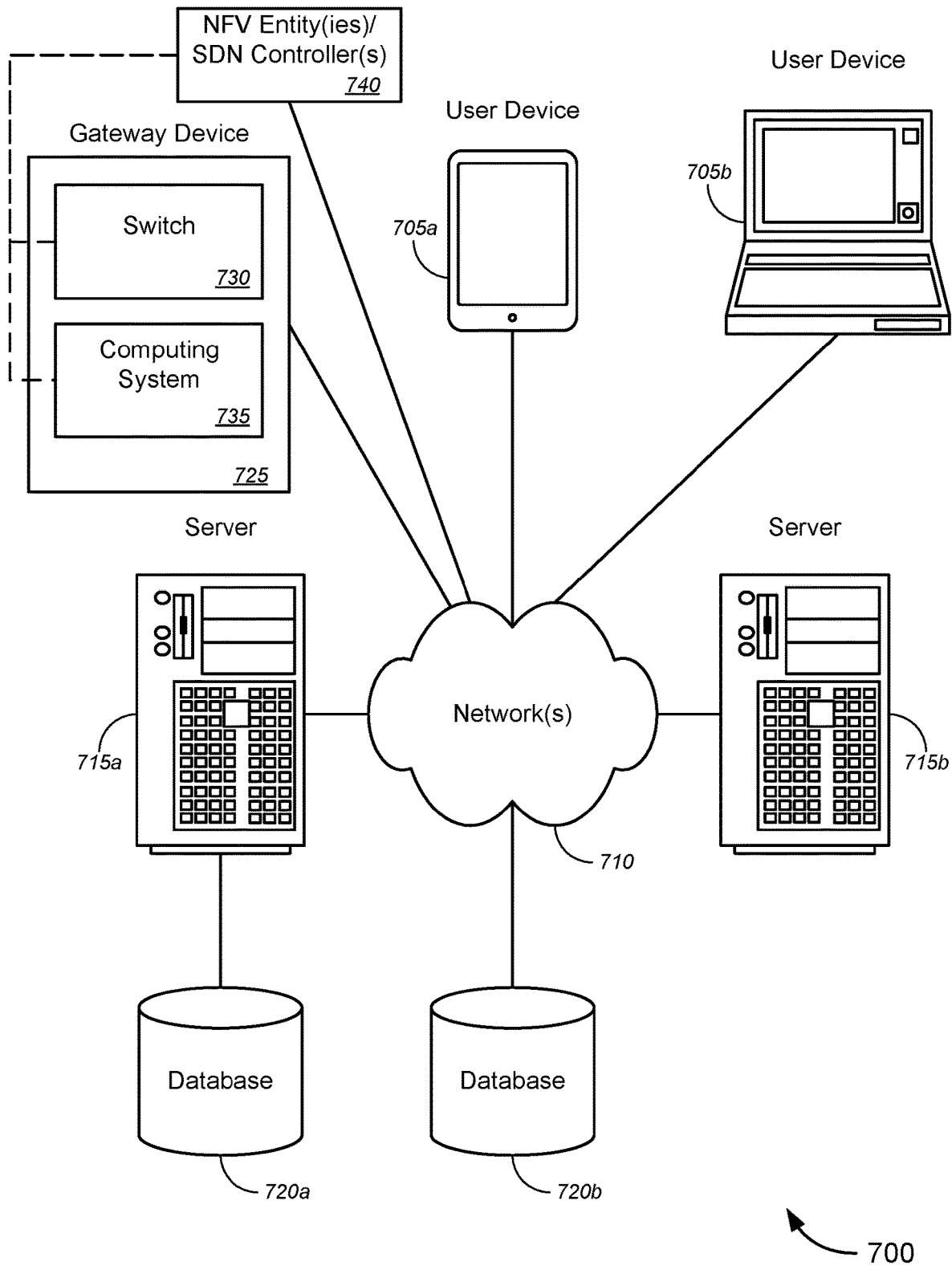
FIG. 7 is a block diagram illustrating a networked system of computers, computing systems, or system hardware architecture, which can be used in accordance with various embodiments.

As noted above, a set of embodiments comprises methods and systems for implementing network enhanced gateway functionality, and, in particular embodiments, to methods, systems, apparatus, and computer software for implementing network enhanced gateway functionality using network functions virtualization ("NFV") and/or software defined networks ("SDNs"). FIG. 7 illustrates a schematic diagram of a system 700 that can be used in accordance with one set of embodiments. The system 700 can include one or more user computers, user devices, or customer devices 705. A user computer, user device, or customer device 705 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 705 can also have any of a variety of applications, including one or more applications configured to perform methods provided by various embodiments (as described above, for example), as well as one or more office applications, database client and/or server applications, and/or web browser applications. Alternatively, a user computer, user device, or customer device 705 can be any other electronic device, such as a thin-client computer, Internet-enabled mobile telephone, and/or personal digital assistant, capable of communicating via a network (e.g., the network(s) 710 described below) and/or of displaying and navigating web pages or other types of electronic documents. Although the exemplary system 700 is shown with two user computers, user devices, or customer devices 705, any number of user computers, user devices, or customer devices can be supported.

Certain embodiments operate in a networked environment, which can include a network(s) 710. The network(s) 710 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 710 (similar to network 140a, 140b, and/or 140c, 240, 340, or 440 of FIGS. 1-4, respectively, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 715. Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, a web server, a cloud computing device(s), or the like, as described above. The data server might include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 705 and/or another server 715. In some embodiments, an application server can perform one or more of the processes for implementing network enhanced gateway functionality, and, in particular embodiments, to methods, systems, apparatus, and computer software for implementing network enhanced gateway functionality using NFV and/or SDNs, or the like, as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer, user device, or customer device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720a-720n (collectively, "databases 720"). The location of each of the databases 720 is discretionary: merely by way of example, a database 720a might reside on a storage medium local to (and/or resident in) a server 715a (and/or a user computer, user device, or customer device 705). Alternatively, a database 720n can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle database, that is adapted to store, update, and retrieve data in response to SQL-formatted commands. The database might be controlled and/or maintained by a database server, as described above, for example.

According to some embodiments, system 700 might further comprise a gateway device 725 (similar to gateway device 105, 205, 305, or 405 of FIGS. 1-4, respectively, or the like). Gateway device 725 might comprise a switch 730 (similar to switch 110, 210, 310, or 410 of FIGS. 1-4, respectively, or the like) and a computing system 735

(similar to computing system 125, 225, 325, or 425 of FIGS. 1-4, respectively, or the like). Although FIG. 7 shows computing system 735 embodied within gateway device 725, the various embodiments are not so limited, and computing system 735 may be embodied external to the gateway device 725, while being communicatively coupled to the gateway device 725 via a host port (not shown; similar to host port 130, 230, 330, or 430 of FIGS. 1-4, respectively, or the like). System 700 might further comprise one or more NFV entities 740 and/or one or more SDN controllers 740. In some cases, the one or more NFV entities 740 might include, without limitation, one or more of a NFV resource manager (e.g., NFV resource manage 150 of FIG. 1, or the like), a NFVI system (e.g., NFVI system 155 of FIG. 1, or the like), a NFV orchestrator (e.g., NFV orchestrator 160 of FIG. 1, or the like), a NFV MANO architectural framework or system (e.g., NFV MANO architectural framework or system 165 of FIG. 1, or the like), a VNF manager (e.g., VNF manager 170 of FIG. 1, or the like), a VIM (e.g., VIM 175 of FIG. 1, or the like), other NFV entities (e.g., other NFV entities 180 of FIG. 1, or the like), a NFV entity (e.g., NFV entities 250, 350, and 450 of FIGS. 2-3, or the like), and/or the like). The one or more NFV entities and/or SDN controllers 740 might communicatively couple with, and control, at least one of switch 730 and/or computing system 735, as described in detail above with respect to the embodiments of FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    receiving, with a network switch disposed within a gateway device, network traffic, at least a portion of the network traffic being directed to a client device via the network switch and via corresponding client port among a plurality of client ports;
    routing, with the network switch, the network traffic comprising at least the portion of the network traffic being directed to the client device to a host computing system, wherein the host computing system is different from the client device;
    determining, with the host computing system, one or more characteristics of the portion of the network traffic being directed to the client device that is routed from the network switch to the host computing system, wherein the one or more characteristics of the portion of the network traffic being directed to the client device used to select the one or more VNFs comprise at least one of one or more attributes of an Ethernet frame, one or more media access control ("MAC") source addresses, one or more MAC destination addresses, one or more Internet Protocol ("IP") source addresses, one or more IP destination addresses, one or more transmission control protocol ("TCP") source ports, one or more TCP destination ports, one or more priority bits, one or more particular bit patterns, bandwidth of a flow, one or more switch ports, one or more ingress ports, one or more Ethernet type identifiers, one or more virtual local area network ("VLAN") identifiers, one or more network protocol identifiers, or one or more action instructions;
    based on the determined one or more characteristics of the portion of the network traffic being directed to the client device that is routed from the network switch to the host computing system, selecting, with the host computing system, one or more virtual network functions ("VNFs"); and
    sending, with the host computing system via the network switch and the corresponding client port, at least one VNF of the selected one or more VNFs to the client device, the at least one VNF being selected by the host computing system based at least in part on one or more characteristics of the at least a portion of the network traffic that is directed to the client device, wherein the at least one VNF provides the client device with one or more functions, the one or more functions comprising at least one of an activation function, a deletion function, a specialized function, or an Internet of Things ("IoT") proxy function.

2. The method of claim 1, wherein the network switch and the host computing system are under control of at least one of a network functions virtualization ("NFV") entity or a software defined network ("SDN") controller.

3. The method of claim 2, wherein the NFV entity comprises at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator.

4. The method of claim 1, wherein the host computing system and the network switch are disposed within a single gateway device.

5. The method of claim 1, wherein the host computing system is located external to the gateway device in which the network switch is disposed, wherein the gateway device comprises a host port, and wherein the host computing system communicatively couples to the network switch via the host port.

6. The method of claim 1, wherein the host computing system hosts an instantiated network functions virtualization infrastructure ("NFVI") system.

7. The method of claim 1, wherein the network switch comprises at least one network-to-network interface ("NNI") and at least one user network interface ("UNI"), the NNI receiving the network traffic and communicatively coupling with the host computing system, and the UNI communicatively coupling with the client device via the corresponding client port of the plurality of client ports.

8. The method of claim 1, wherein the network switch is a virtual network switch that utilizes a network switch VNF to provide network switching functionality.

9. The method of claim 1, wherein the gateway device is selected from a group consisting of a customer premises equipment ("CPE"), a router, a switch, a network element, a demarcation device, a WiFi gateway device, a hypervisor platform, and one or more virtual machine-based host machines.

10. The method of claim 9, wherein the CPE comprises at least one of an optical network terminal ("ONT"), a network interface device ("NID"), an enhanced NID ("eNID"), a residential gateway ("RG") device, a business gateway ("BG") device, or a virtual gateway ("vG") device, wherein the gateway device is located at or near a customer premises associated with a user of the client device.

11. The method of claim 1, wherein the client device includes a user device comprising one of a tablet computer, a smart phone, a mobile phone, a portable gaming device, a laptop computer, or a desktop computer.

12. The method of claim 1, wherein the client device includes a device selected from a group consisting of a small form factor pluggable ("SFP") device, an enhanced SFP ("SFP+") device, a compact SFP ("CSFP") device, a gigabit interface converter ("GBIC"), and a universal serial bus ("USB") pluggable device.

13. The method of claim 12, wherein at least one of the SFP device, the SFP+device, or the CSFP device comprises at least one of a SFP network interface device ("NID"), a SFP router, a SFP modem, or a SFP wireless access point.

14. The method of claim 12, wherein the USB pluggable device comprises one of a printer, a scanner, a combination printer/scanner device, an external hard drive, a camera, a keyboard, a mouse, a drawing interface device, or a mobile device.

15. The method of claim 1, wherein the client device includes a VNF-capable user device comprising one of a set-top box or an Internet of Things ("IoT") controller, wherein the method further comprises:
sending, with the host computing system and via the network switch and the corresponding client port, at least one second VNF of the selected one or more VNFs to the client device, the at least one second VNF being selected by the host computing system based at least in part on one or more characteristics of the at least a portion of the network traffic that is directed to the client device.

16. The method of claim 15, wherein sending, with the host computing system and via the network switch and the corresponding client port, the selected one or more VNFs to the client device comprises bursting, using an application programming interface ("API"), the one or more VNFs from the NFV entity to the client device.

17. The method of claim 1, wherein the one or more functions further comprises at least one of an operation function, a firewall function, an operations, administration, and management ("OAM") function, or an application-related function.

18. The method of claim 1, wherein each of the plurality of client ports comprises one of a local area network ("LAN") port, a Wi-Fi port, an advanced technology attachment ("ATA") port, a serial ATA ("SATA") port, an external SATA ("eSATA") port, a powered eSATA ("eSATAp") port, a mini SATA ("mSATA") port, a SATA Express port, a M.2 port, or a universal serial bus ("USB") port.

19. The method of claim 1, wherein the network traffic between the network switch and the host computing system is at least one of uni-directional network traffic, bi-directional network traffic, or split directional network traffic that originates from at least one of one or more of the plurality of client ports or one or more network ports.

20. A gateway device, comprising:
a transceiver;
a plurality of client ports;
a network switch communicatively coupled to the transceiver and to each of the plurality of client ports, wherein the network switch:
receives network traffic, at least a portion of the network traffic being directed from the transceiver to a client device via the network switch and a corresponding client port among the plurality of client ports;
routes the network traffic comprising at least the portion of the network traffic being directed to the client device to a host computing system, wherein the host computing system is different from the client device; and
forwards one or more virtual network functions ("VNFs") to the host computing system, wherein the host computing system determines one or more characteristics of the portion of the network traffic being directed to the client device that is routed from the network switch to the host computing system, wherein the one or more characteristics of the portion of the network traffic being directed to the client device used to select the one or more VNFs comprise at least one of one or more attributes of an Ethernet frame, one or more media access control ("MAC") source addresses, one or more MAC destination addresses, one or more Internet Protocol ("IP") source addresses, one or more IP destination addresses, one or more transmission control protocol ("TCP") source ports, one or more TCP destination ports, one or more priority bits, one or more particular bit patterns, bandwidth of a flow, one or more switch ports, one or more ingress ports, one or more Ethernet type identifiers, one or more virtual local area network ("VLAN") identifiers, one or more network protocol identifiers, or one or more action instructions and, based on the determined one or more characteristics of the portion of the network traffic being directed to the client device that is routed from the network switch to the host computing system, the host computing system selects the one or more VNFs and sends via the network switch and the corresponding client port at least one VNF of the selected one or more VNFs to the client device.

21. The gateway device of claim 20, further comprising:
the host computing system.

22. The gateway device of claim 20, further comprising:
a host port, wherein the host computing system communicatively couples with the network switch via the host port.

23. The gateway device of claim 20, wherein the host computing system comprises at least one of an x86 host computing device or an advanced reduced instruction set computer ("RISC") machine ("ARM") computing device.

24. The gateway device of claim 20, wherein the host computing system comprises one or more computing cores.

25. The gateway device of claim 20, wherein the network switch and the host computing system are under control of at least one of a network functions virtualization ("NFV") entity or a software defined network ("SDN") controller.

26. The gateway device of claim 25, wherein the NFV entity comprises at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator.

27. The gateway device of claim 20, wherein the network switch is a virtual network switch that utilizes a network switch VNF to provide network switching functionality.

28. The gateway device of claim 20, wherein the transceiver is a virtual transceiver that utilizes a transceiver VNF to provide transceiver functionality.

29. The gateway device of claim 20, wherein the gateway device is selected from a group consisting of a customer premises equipment ("CPE"), a router, a switch, a network element, a demarcation device, a WiFi gateway device, a hypervisor platform, and one or more virtual machine-based host machines.

30. The gateway device of claim 29, wherein the CPE comprises at least one of an optical network terminal ("ONT"), a network interface device ("NID"), an enhanced NID ("eNID"), a residential gateway ("RG") device, a business gateway ("BG") device, or a virtual gateway ("vG") device, wherein the gateway device is located at or near a customer premises associated with a user of the client device.

31. A system, comprising:
a network switch;
a host computing system; and
at least one of a network functions virtualization ("NFV") entity or a software defined network ("SDN") controller, the at least one of the NFV entity or the SDN controller controlling:
the network switch to route network traffic comprising at least a portion of the network traffic being directed to the client device via the network switch and a corresponding client port among a plurality of client ports, to the host computing system, wherein the host computing system is different from the client device;
the host computing system to determine one or more characteristics of the portion of the network traffic being directed to the client device that is routed from the network switch to the host computing system, wherein the one or more characteristics of the portion of the network traffic being directed to the client device used to select the one or more VNFs comprise at least one of one or more attributes of an Ethernet frame, one or more media access control ("MAC") source addresses, one or more MAC destination addresses, one or more Internet Protocol ("IP") source addresses, one or more IP destination addresses, one or more transmission control protocol ("TCP") source ports, one or more TCP destination ports, one or more priority bits, one or more particular bit patterns, bandwidth of a flow, one or more switch ports, one or more ingress ports, one or more Ethernet type identifiers, one or more virtual local area network ("VLAN") identifiers, one or more network protocol identifiers, or one or more action instructions and based on the determined one or more characteristics of the portion of the network traffic being directed to the client device that is routed from the network switch to the host computing system, select one or more virtual network functions ("VNFs") and send via the network switch and the corresponding client port at least one VNF of the selected one or more VNFs to the client device; and
the network switch to forward at least one VNF of the selected one or more VNFs to the client device, the at least one VNF being selected by the host computing system based at least in part on one or more characteristics of the at least a portion of the network traffic that is directed to the client device, wherein the at least one VNF provides the client device with one or more functions, the one or more functions comprising at least one of an activation function, a deletion function, a specialized function, or an Internet of Things ("IoT") proxy function.

32. The system of claim 31, wherein the NFV entity comprises at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator.

33. The system of claim 31, wherein the host computing system and the network switch are disposed within a single gateway device.

34. The system of claim 31, wherein the host computing system is located external to a gateway device in which the network switch is disposed, wherein the gateway device comprises a host port, and wherein the host computing system communicatively couples to the network switch via the host port.

35. The system of claim 31, wherein the host computing system hosts an instantiated network functions virtualization infrastructure ("NFVI") system.

* * * * *